(12) United States Patent
Iwase et al.

(10) Patent No.: US 11,335,334 B2
(45) Date of Patent: May 17, 2022

(54) INFORMATION PROCESSING DEVICE AND INFORMATION PROCESSING METHOD

(71) Applicant: SONY CORPORATION, Tokyo (JP)

(72) Inventors: Hiro Iwase, Kanagawa (JP); Shinichi Kawano, Tokyo (JP); Yuhei Taki, Kanagawa (JP); Kunihito Sawai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 190 days.

(21) Appl. No.: 16/464,494

(22) PCT Filed: Oct. 19, 2018

(86) PCT No.: PCT/JP2018/038944
§ 371 (c)(1),
(2) Date: May 28, 2019

(87) PCT Pub. No.: WO2019/087811
PCT Pub. Date: May 9, 2019

(65) Prior Publication Data
US 2021/0110814 A1    Apr. 15, 2021

(30) Foreign Application Priority Data

Nov. 2, 2017 (JP) .............................. JP2017-212744

(51) Int. Cl.
*G10L 15/18* (2013.01)
*G10L 15/02* (2006.01)
*G10L 25/78* (2013.01)

(52) U.S. Cl.
CPC .......... *G10L 15/1815* (2013.01); *G10L 15/02* (2013.01); *G10L 25/78* (2013.01); *G10L 2025/783* (2013.01)

(58) Field of Classification Search
CPC ....... G10L 15/00; G10L 15/005; G10L 15/01; G10L 15/02; G10L 15/04; G10L 15/18;
(Continued)

(56) References Cited

U.S. PATENT DOCUMENTS

| 8,219,407 B1 * | 7/2012 | Roy | ...................... H04L 12/282 |
| | | | 704/275 |
| 9,311,932 B2 * | 4/2016 | Carter | ..................... G10L 25/78 |

(Continued)

FOREIGN PATENT DOCUMENTS

JP         2000067047 A  *  3/2000

OTHER PUBLICATIONS

JP2000067047A—translation (Year: 2000).*

*Primary Examiner* — Huyen X Vo
*Assistant Examiner* — Darioush Agahi
(74) *Attorney, Agent, or Firm* — Paratus Law Group, PLLC

(57) ABSTRACT

There is provided an information processing device and an information processing method that enable the intention of a speech of a user to be estimated more accurately. The information processing device includes: a detection unit configured to detect a breakpoint of a speech of a user on the basis of a result of recognition that is to be obtained during the speech of the user; and an estimation unit configured to estimate an intention of the speech of the user on the basis of a result of semantic analysis of a divided speech sentence obtained by dividing a speech sentence at the detected breakpoint of the speech. The present technology can be applied, for example, to a speech dialogue system.

21 Claims, 13 Drawing Sheets

(58) Field of Classification Search
CPC ....... G10L 15/187; G10L 15/22; G10L 15/24; G10L 15/26; G10L 17/00; G10L 17/16; G10L 15/1815; G10L 25/78; G10L 25/783

See application file for complete search history.

(56) References Cited

U.S. PATENT DOCUMENTS

| | | | |
|---|---|---|---|
| 10,032,451 B1* | 7/2018 | Mamkina | G06F 21/32 |
| 10,134,425 B1* | 11/2018 | Johnson, Jr. | G10L 15/05 |
| 2003/0023439 A1* | 1/2003 | Ciurpita | G10L 15/22 |
| | | | 704/246 |
| 2005/0267759 A1* | 12/2005 | Jeschke | B60R 16/0373 |
| | | | 704/270 |
| 2014/0337370 A1* | 11/2014 | Aravamudan | G06F 16/433 |
| | | | 707/759 |
| 2016/0188574 A1* | 6/2016 | Homma | G06F 40/216 |
| | | | 704/9 |
| 2018/0232662 A1* | 8/2018 | Solomon | A61B 5/7475 |
| 2018/0233163 A1* | 8/2018 | Eagleman | G10L 15/02 |
| 2018/0260680 A1* | 9/2018 | Finkelstein | G06N 5/04 |
| 2018/0268812 A1* | 9/2018 | Kim | G10L 15/26 |

\* cited by examiner

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2018/038944 (filed on Oct. 19, 2018) under 35 U.S.C. § 371, which claims priority to Japanese Patent Application No. 2017-212744 (filed on Nov. 2, 2017), which are all hereby incorporated by reference in their entirety.

TECHNICAL FIELD

The present technology relates to an information processing device and an information processing method, and particularly to an information processing device and an information processing method that enable the intention of a speech of a user to be estimated more accurately.

BACKGROUND ART

In recent years, a speech dialogue system that makes a response corresponding to a speech of a user has started to be used in various fields. The speech dialogue system is required not only to recognize a voice of the speech of the user, but also to make an appropriate response by estimating the intention of the speech of the user.

For example, Patent Literature 1 discloses a technology of enhancing the analytical capacity of a long sentence by dividing an input sentence into elements using a language grammar, and performing semantic analysis of the divided elements.

CITATION LIST

Patent Literature

Patent Literature 1: JP H6-295308A

DISCLOSURE OF INVENTION

Technical Problem

Nevertheless, in the division of an input sentence using a language grammar that is disclosed in Patent Literature 1 described above, there is a possibility that a variety of expressions included in a speech of a user fail to be correctly divided in a unit of the intention of the user. Thus, when a long sentence, a complex sentence, or the like that includes a plurality of intentions is spoken by the user, the intention of the speech of the user sometimes fails to be accurately estimated.

The present technology has been devised in view of such a situation, and enables the intention of a speech of a user to be estimated more accurately.

Solution to Problem

An information processing device of an aspect of the present technology is an information processing device including: a detection unit configured to detect a breakpoint of a speech of a user on the basis of a result of recognition that is to be obtained during the speech of the user; and an estimation unit configured to estimate an intention of the speech of the user on the basis of a result of semantic analysis of a divided speech sentence obtained by dividing a speech sentence at the detected breakpoint of the speech.

An information processing method of an aspect of the present technology is an information processing method of an information processing device, the information processing method including: the information processing device detecting a breakpoint of a speech of a user on the basis of a result of recognition that is to be obtained during the speech of the user; and estimating an intention of the speech of the user on the basis of a result of semantic analysis of a divided speech sentence obtained by dividing a speech sentence at the detected breakpoint of the speech.

In an information processing device and an information processing method of an aspect of the present technology, a breakpoint of a speech of a user is detected on the basis of a result of recognition that is to be obtained during the speech of the user; and an intention of the speech of the user is estimated on the basis of a result of semantic analysis of a divided speech sentence obtained by dividing a speech sentence at the detected breakpoint of the speech.

The information processing device according to the aspect of the present technology may be an independent device or may be an internal block constituting one device.

Advantageous Effects of Invention

According to the aspect of the present technology, it is possible to estimate the intention of a speech of a user more accurately.

Moreover, the advantageous effects mentioned here are not necessarily limited and any advantageous effect described in the present disclosure may be obtained.

MODE(S) FOR CARRYING OUT THE INVENTION

Hereinafter, an embodiment of the present technology will be described with reference to the drawings. Moreover, the description will be given in the following order.
1. Embodiment of present technology
2. Modified example
3. Configuration of computer

1. Embodiment of Present Technology (Configuration Example of Speech Dialogue System)

Figure 1:
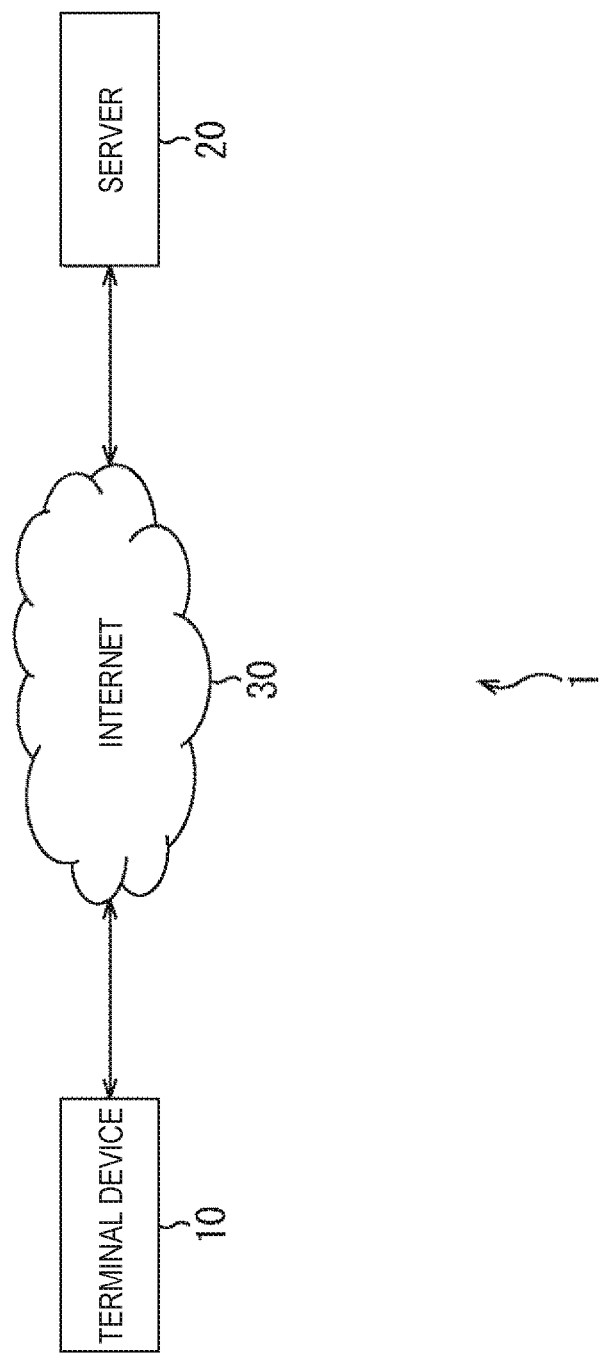
FIG. 1 is a block diagram illustrating an example of a configuration of a speech dialogue system to which the present technology is applied.

FIG. 1 is a block diagram illustrating an example of a configuration of a speech dialogue system to which the present technology is applied.

A speech dialogue system 1 includes a terminal device 10 that is installed on a local side such as a user's home, and functions as a user interface of a speech dialogue service, and a server 20 that is installed on a cloud side such as a data center, and performs processing for implementing a speech dialogue function. In the speech dialogue system 1, the terminal device 10 and the server 20 are connected to each other via an internet 30.

For example, the terminal device 10 is a speaker that can be connected to a network such as a home local area network (LAN), and is also referred to as a smart speaker, a home agent, and the like. Aside from the replay of music, a speaker of this type has functions of a speech dialogue with a user, a voice operation of a device such as a lighting device and an air conditioner, and the like, for example.

Moreover, the terminal device 10 is not limited to the speaker, and may be formed as a game machine, a mobile device such as a smartphone and a mobile phone, a tablet computer, or the like, for example.

By cooperating with the server 20 via the internet 30, the terminal device 10 can provide a user with (a user interface of) the speech dialogue service.

For example, the terminal device 10 collects a voice (user speech) emitted by a user, and transmits the voice data to the server 20 via the internet 30. In addition, the terminal device 10 receives processing data transmitted from the server 20 via the internet, and outputs information such as a voice corresponding to the processing data.

The server 20 is a server that provides a cloud-based speech dialogue service.

For example, the server 20 performs processing such as speech recognition processing and semantic analysis processing on the basis of voice data transmitted from the terminal device 10 via the internet 30, and transmits processing data corresponding to a result of the processing, to the terminal device 10 via the internet 30.

(Functional Configuration Example of Speech Dialogue System)

Figure 2:
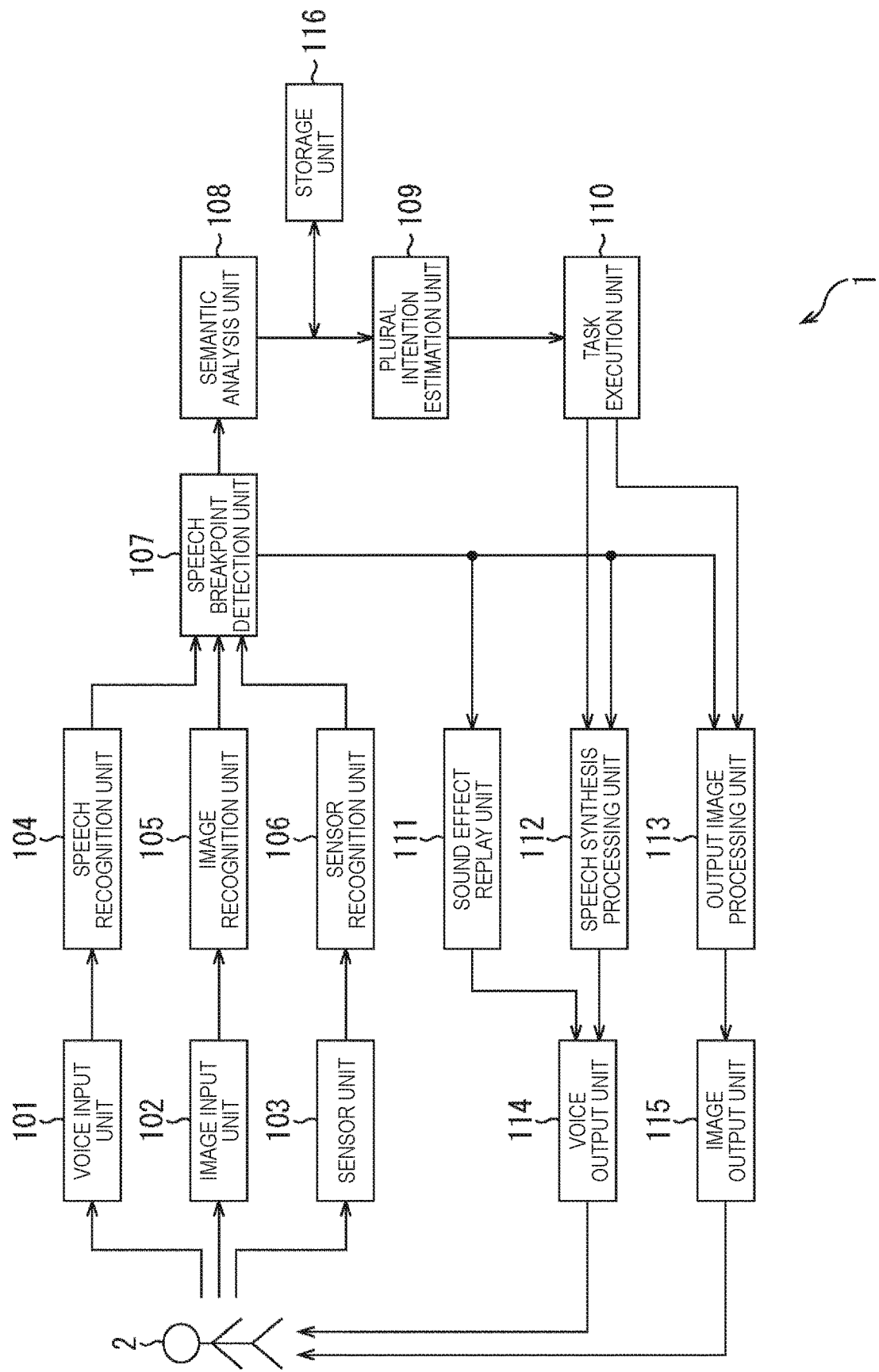
FIG. 2 is a block diagram illustrating an example of a functional configuration of the speech dialogue system to which the present technology is applied.

FIG. 2 is a block diagram illustrating an example of a functional configuration of the speech dialogue system 1 illustrated in FIG. 1.

In FIG. 2, the speech dialogue system 1 includes a voice input unit 101, an image input unit 102, a sensor unit 103, a speech recognition unit 104, an image recognition unit 105, a sensor recognition unit 106, a speech breakpoint detection unit 107, a semantic analysis unit 108, a plural intention estimation unit 109, a task execution unit 110, a sound effect replay unit 111, a speech synthesis processing unit 112, an output image processing unit 113, a voice output unit 114, an image output unit 115, and a storage unit 116.

The voice input unit 101 includes a voice input device such as a microphone, for example. The voice input unit 101 supplies, to the speech recognition unit 104, voice data obtained by converting a voice emitted by a user 2, into an electrical signal.

The image input unit 102 includes an image input device such as a camera that includes an image sensor, for example. The image input unit 102 supplies, to the image recognition unit 105, image data obtained by capturing an image of a subject such as the user 2.

The sensor unit 103 includes a sensor device such as various types of sensors, for example. The sensor unit 103 performs sensing of the user 2, a surrounding thereof, and the like, and supplies, to the sensor recognition unit 106, sensor data corresponding to the sensing result.

Here, as the sensor unit 103, for example, a biosensor that detects biological information such as aspiration, a pulse-beat, a fingerprint, and iris, a magnetic sensor that detects a size and a direction of a magnetizing field (magnetic field), an acceleration sensor that detects acceleration, a gyro sensor that detects an angle (attitude), angular velocity, and angular acceleration, a proximity sensor that detects an object that approaches, and the like can be included.

In addition, the sensor unit 103 may be a brain wave sensor that is attached to a head portion of the user 2, and detects brain waves by measuring an electric potential or the like. Furthermore, the sensor unit 103 can include a sensor for measuring a surrounding environment, such as a temperature sensor that detects temperature, a humidity sensor that detects humidity, and an environmental light sensor that detects brightness of the surrounding, and a sensor for detecting position information such as a Global Positioning System (GPS) signal.

On the basis of the voice data to be supplied from the voice input unit 101, the speech recognition unit 104 performs speech recognition processing, and supplies a result of the speech recognition to the speech breakpoint detection unit 107.

In the speech recognition processing, for example, processing of converting the voice data from the voice input unit 101 into text data (speech sentence) by referring to a database for speech-text conversion or the like is performed.

In addition, in the speech recognition processing, for example, processing for extracting a result of speech recognition that is to be used in subsequent speech breakpoint detection processing, such as processing of analyzing (a signal waveform of) the voice data from the voice input unit 101, is performed on the voice data.

Moreover, in the following description, in the speech recognition processing to be performed by the speech recognition unit 104, speech recognition for obtaining text data (speech sentence) of a speech of the user 2 will be described as "speech recognition (ASR: Automatic Speech Recognition)", and will be distinguished from a result of speech recognition that is to be used for detecting a breakpoint of a speech in the subsequent speech breakpoint detection processing. Furthermore, text data to be obtained as a result of the speech recognition (ASR) performed by the speech recognition processing will be described as a "speech sentence".

On the basis of the image data to be supplied from the image input unit 102, the image recognition unit 105 performs image recognition processing, and supplies a result of the image recognition to the speech breakpoint detection unit 107. In the image recognition processing, processing for extracting a result of the image recognition that is to be used in the subsequent speech breakpoint detection processing is performed on the image data.

On the basis of the sensor data to be supplied from the sensor unit 103, the sensor recognition unit 106 performs sensor recognition processing, and supplies a result of the sensor recognition to the speech breakpoint detection unit 107. In the sensor recognition processing, processing for extracting a result of the sensor recognition that is to be used in the subsequent speech breakpoint detection processing is performed on the sensor data.

Together with a speech sentence being a result of the speech recognition (ASR) performed by the speech recognition unit 104, the result of the speech recognition from the speech recognition unit 104, the result of the image recognition from the image recognition unit 105, and the result of the sensor recognition from the sensor recognition unit 106 are supplied to the speech breakpoint detection unit 107.

On the basis of the result of the speech recognition, the result of the image recognition, and the result of the sensor recognition, the speech breakpoint detection unit 107 performs the speech breakpoint detection processing on the speech sentence, and supplies a result of the speech breakpoint detection to the semantic analysis unit 108. In addition, the speech breakpoint detection unit 107 supplies the result of the speech breakpoint detection to the sound effect replay unit 111, the speech synthesis processing unit 112, or the output image processing unit 113.

On the basis of at least one result of recognition among the result of the speech recognition, the result of the image recognition, or the result of the sensor recognition, the speech breakpoint detection processing detects a breakpoint of a speech when a time of a pause of the speech exceeds a fixed time, when a boundary of an intonation phrase is detected, when falter or filler is detected, and the like, for example.

Moreover, in the following description, text data to be obtained by dividing a speech sentence to be obtained as a result of speech recognition (ASR), using a breakpoint position of a speech that has been detected by the speech breakpoint detection processing, as a boundary will be described as a "divided speech sentence". In addition, the details of the speech breakpoint detection processing will be described later with reference to FIGS. 4 to 6 and the like.

On the basis of a result of the speech breakpoint detection (divided speech sentence) that is to be supplied from the speech breakpoint detection unit 107, the semantic analysis unit 108 performs semantic analysis processing, and supplies a result of the semantic analysis to the plural intention estimation unit 109.

In the semantic analysis processing, processing of converting a divided speech sentence (text data) obtained by dividing a speech sentence expressed in a natural language that is to be obtained as a result of speech recognition (ASR), into an expression understandable to a machine (system) by referring to a database for speech language understanding or the like, for example is performed.

Here, as a result of the semantic analysis, the meaning of the speech is expressed in the form of an "intention (Intent)" desired by the user to be executed, and "entity information (Entity)" that serves as a parameter thereof. Moreover, in the following description, the semantic analysis processing will also be described as "semantic analysis (NLU: Natural Language Understanding)". In addition, in the following description, by describing an intention to be obtained as a result of the semantic analysis (NLU) performed for each divided speech sentence, as an "intention (Intent)" or "Intent", the intention will be distinguished from the intention of the speech of the user 2.

On the basis of a result of the semantic analysis (NLU) that is to be supplied from the semantic analysis unit 108, the plural intention estimation unit 109 performs intention estimation processing, and supplies a result of the intention estimation to the task execution unit 110.

In the intention estimation processing, on the basis of a result (Intent, Entity) of semantic analysis (NLU) performed for each divided speech sentence, one or a plurality of intentions of the speech of the user 2 is estimated. Moreover, here, in estimating the intention of the speech of the user 2, other types of information such as a rate of speech of each divided speech sentence, for example, may be used. In addition, the details of the intention estimation processing will be described later with reference to FIGS. 7 to 12 and the like.

Moreover, because divided speech sentences are sequentially input to the semantic analysis unit 108 by the speech breakpoint detection unit 107, and an intention (Intent) and entity information (Entity) are obtained for each of the divided speech sentences, by (temporarily) recording (accumulating) a result of the semantic analysis (NLU) into the storage unit 116, the plural intention estimation unit 109 can acquire a result (Intent, Entity) of semantic analysis of each divided speech sentence that is recorded (accumulated) in the storage unit 116.

On the basis of a result of the intention estimation that is to be supplied from the plural intention estimation unit 109, the task execution unit 110 performs task execution processing, and supplies a result of the task execution to the speech synthesis processing unit 112 and the output image processing unit 113.

On the basis of a result of the speech breakpoint detection that is to be supplied from the speech breakpoint detection unit 107, the sound effect replay unit 111 performs sound effect replay processing, and supplies a result of the sound effect replay to the voice output unit 114.

On the basis of a result of the speech breakpoint detection that is to be supplied from the speech breakpoint detection unit 107, the speech synthesis processing unit 112 performs speech synthesis processing, and supplies a result of the speech synthesis to the voice output unit 114. In addition, on the basis of a result of the task execution that is to be supplied from the task execution unit 110, the speech synthesis processing unit 112 performs speech synthesis processing, and supplies a result of the speech synthesis to the voice output unit 114.

On the basis of a result of the speech breakpoint detection that is to be supplied from the speech breakpoint detection unit 107, the output image processing unit 113 performs output image processing, and supplies a result of an output image to the image output unit 115. In addition, on the basis of a result of the task execution that is to be supplied from the task execution unit 110, the output image processing unit 113 performs output image processing, and supplies a result of the output image to the image output unit 115.

The voice output unit 114 includes a voice output device such as a speaker and headphones, for example. On the basis of a result of the sound effect replay that is to be supplied from the sound effect replay unit 111, or a result of the speech synthesis that is to be supplied from the speech synthesis processing unit 112, the voice output unit 114 outputs a sound corresponding to these voice data, as a system response (response).

The image output unit 115 includes an image output device such as a liquid crystal display or an organic EL display, for example. On the basis of a result of the output image that is to be supplied from the output image processing unit 113, the image output unit 115 outputs (displays) an image corresponding to the image data, as a system response (response).

The speech dialogue system 1 has the above-described configuration.

Moreover, in the speech dialogue system 1 in FIG. 2, structural elements from the voice input unit 101 to the storage unit 116 can be arbitrarily incorporated into either device of the terminal device 10 (FIG. 1) and the server 20 (FIG. 1). For example, the following configuration can be employed.

More specifically, while the voice input unit 101, the image input unit 102, the sensor unit 103, the voice output unit 114, and the image output unit 115 that function as a user interface can be incorporated into the terminal device 10 provided on the local side, the speech recognition unit 104, the image recognition unit 105, the sensor recognition unit 106, the speech breakpoint detection unit 107, the semantic analysis unit 108, the plural intention estimation unit 109, the task execution unit 110, the sound effect replay unit 111, the speech synthesis processing unit 112, the output image processing unit 113, and the storage unit 116 that have other functions can be incorporated into the server 20 provided on the cloud side.

At this time, the speech recognition unit 104, the image recognition unit 105, the sensor recognition unit 106, the speech breakpoint detection unit 107, the semantic analysis unit 108, the plural intention estimation unit 109, the task execution unit 110, the sound effect replay unit 111, the speech synthesis processing unit 112, and the output image processing unit 113 are implemented by a central processing unit (CPU) of the server 20 executing programs, for example. In addition, the storage unit 116 includes a random access memory (RAM), which is one type of a volatile memory, for example.

In addition, for exchanging data via the internet 30, the terminal device 10 and the server 20 each include a communication I/F including a communication interface circuit or the like, which is not illustrated in the drawing. With this configuration, during the speech of the user 2, the terminal device 10 and the server 20 can perform communication via the internet 30, and on the server 20 side, processing such as the speech breakpoint detection processing can be performed on the basis of a result of recognition from the terminal device 10.

Furthermore, the terminal device 10 may have the following configuration. For example, an input unit including a button, a keyboard, and the like is provided so that an operation signal corresponding to an operation of the user can be obtained. Alternatively, the image output unit 115 is formed as a touch panel in which a touch sensor and a display unit are integrated, so that an operation signal corresponding to an operation performed by the user using a finger or a touch pen (stylus pen) can be obtained.

(Flow of Speech Dialogue Processing)

Next, a flow of speech dialogue processing to be executed by the speech dialogue system 1 will be described with reference to a flowchart in FIG. 3.

The speech dialogue processing is executed when a speech is started by the user 2 existing near the terminal device 10. Moreover, here, when the user 2 starts a speech, for example, an explicit instruction for starting the speech may be issued by a call that uses a specific keyword (so-called activation word), plosive sound produced by clapping hands, or the like.

In step S11, the voice input unit 101 receives a speech of the user 2 by collecting a voice emitted by the user 2.

In step S12, a recognition unit such as the speech recognition unit 104 performs recognition processing during the user speech on the basis of data from a preceding input unit such as the voice input unit 101.

Here, for example, speech recognition processing is performed by the speech recognition unit 104 on the basis of voice data from the voice input unit 101, and a result of speech recognition (ASR) is obtained. In addition, among speech recognition processing to be performed by the speech recognition unit 104, image recognition processing to be performed by the image recognition unit 105, and sensor recognition processing to be performed by the sensor recognition unit 106, at least one type of recognition processing is performed, and a result of recognition that is to be used in the subsequent speech breakpoint detection processing (S13) is obtained.

In step S13, on the basis of the result of recognition (a result of recognition of each input unit) that is obtained in the process in step S12, the speech breakpoint detection unit 107 performs the speech breakpoint detection processing on a speech sentence obtained as a result of speech recognition (ASR), and detects a breakpoint of the speech of the user 2.

In step S14, the semantic analysis unit 108 performs semantic analysis processing of a divided speech sentence divided at a breakpoint position of the speech that is obtained in the process in step S13.

By the semantic analysis processing, processing of converting a divided speech sentence (text data) obtained by dividing a speech sentence expressed in a natural language that is to be obtained as a result of speech recognition (ASR), into an expression understandable to a machine (system) is performed. A result of (Intent, Entity) of semantic analysis (NLU) of a divided speech sentence is thereby obtained.

In step S15, the speech synthesis processing unit 112 generates feedback information (e.g. voice saying "yes") indicating the reception of a speech intention at the breakpoint position of the speech that is obtained in the process in step S13, and outputs the generated feedback information from the voice output unit 114. The feedback information is thereby output (presented) to the user 2 as a system response (response).

Moreover, here, in addition to outputting a voice synthesized by the speech synthesis processing unit 112, as the feedback information, for example, a sound effect replayed by the sound effect replay unit 111, or an output image generated by the output image processing unit 113 may be output.

In step S16, on the basis of a voice collected by the voice input unit 101, it is determined whether or not the speech of the user 2 has been completed.

In a case in which it is determined in step S16 that the speech of the user 2 has not been completed, the processing returns to step S11, and the above-described processes in steps S11 to S15 are repeated.

More specifically, by the processes in steps S11 to S15 being repeated, divided speech sentences obtained for respective breakpoints of the speech of the user 2 are sequentially input (subjected) to the semantic analysis processing, and a result (Intent, Entity) of semantic analysis (NLU) is obtained for each of the divided speech sentences. With respect to the speech of the user 2, an intention (Intent) and entity information (Entity) of each divided speech sentence are thereby recorded (accumulated) into the storage unit 116 as a result of semantic analysis (NLU).

Then, in a case in which it is determined in step S16 that the speech of the user 2 has been completed, the processing is advanced to step S17.

In step S17, on the basis of the results (Intent, Entity) of semantic analysis (NLU) that are sequentially recorded by the processes in steps S1 to S16 being repeated, the plural intention estimation unit 109 performs intention estimation processing, and estimates the intention of the speech of the user 2.

In step S18, on the basis of a result of intention estimation that is obtained in the process in step S17, the task execution unit 110 performs task execution processing, and executes a task of the system that corresponds to the intention of the speech of the user 2. Here, on the basis of the result of the intention estimation of the speech of the user 2, one or a plurality of tasks are executed.

In step S19, the speech synthesis processing unit 112 generates task execution information indicating a result of task execution of the system that is performed in the process in step S18 (e.g. a voice saying that the task has been normally completed), and outputs the generated task execution information from the voice output unit 114. The task execution information is thereby output (presented) to the user 2 as a system response (response).

Moreover, here, in addition to outputting a voice synthesized by the speech synthesis processing unit 112, as the task execution information, for example, an output image generated by the output image processing unit 113 (e.g. an image indicating that the task has been normally completed) or the like may be presented.

Hereinbefore, a flow of the speech dialogue processing has been described.

In the speech dialogue processing (FIG. 3) executed by the speech dialogue system 1, a speech of the user 2 is subjected to the speech recognition processing through the voice input unit 101 such as a microphone, and content of the speech is converted into text and sent to the speech breakpoint detection processing. The speech recognition processing is constantly performed during the speech of the user 2, and text data (divided speech sentence) that can be recognized during the speech is sequentially sent to the speech breakpoint detection processing.

In addition, the speech recognition processing may not only convert the speech content of the user 2 into text, but also perform detection of a rhythm of an input voice such as pitch extraction of the speech, and sequentially send the detected rhythm to the speech breakpoint detection processing.

Furthermore, aside from the voice of the speech of the user 2, a captured image of the user 2 can be subjected to image recognition processing through the image input unit 102 such as a camera, and a gesture such as a movement of a mouth or a neck of the user 2, or the like can be recognized. Alternatively, biological information or the like of the user 2 can be subjected to sensor recognition processing through the sensor unit 103, and a respiratory condition or the like of the user 2 can be recognized.

These types of recognition processing are constantly performed during the speech of the user 2, and results of the recognition are sequentially sent to the speech breakpoint detection processing.

Then, in the speech dialogue processing (FIG. 3) executed by the speech dialogue system 1, a breakpoint of the speech is detected on the basis of a result of recognition of a state, a gesture, or the like of the user 2 during the speech, semantic analysis (NLU) is sequentially performed on a speech sentence divided at the breakpoint position, one or a plurality of intentions of the user is estimated on the basis of a plurality of intentions (Intents) and pieces of entity information (Entity) that are obtained as a result of the semantic analysis, and a task (action) corresponding to the estimation result is executed.

Here, as a state or a gesture of the user 2 during the speech, for example, there is a small pause of the speech, a movement of a mouth or a neck, biological information, falter or filler, intonation, or the like. Thus, in the speech dialogue system 1, the intention of the speech of the user 2 is estimated more accurately by detecting a speech property of the user, and dividing a speech sentence in a unit in which the intention of the user 2 is desired to be understood.

(Speech Breakpoint Detection Processing)

Next, the detailed content of the speech breakpoint detection processing to be executed by the speech breakpoint detection unit 107 will be described with reference to FIGS. 4 to 6 and the like.

By performing the speech breakpoint detection processing on the basis of results of recognition that are sequentially sent from the speech recognition unit 104, the image recognition unit 105, and the sensor recognition unit 106 during the speech of the user 2, the speech breakpoint detection unit 107 detects a breakpoint position of the speech of the user 2.

In the speech breakpoint detection processing, on the basis of one condition or a combination of a plurality of conditions among conditions (A) to (G) listed below, for example, a timing of a breakpoint of the speech of the user 2 is detected.

(A) When a time of a pause of a speech exceeds a fixed time
(B) When a boundary of an intonation phrase is detected
(C) When falter or filler is detected
(D) When intake of breath is detected
(E) When a time in which a mouth does not move exceeds a fixed time
(F) When a big movement of a visual line is detected
(G) When a big movement of (a part of) a body is detected Moreover, the above-described conditions (A) to (G) are listed exemplary conditions for detecting a breakpoint of a speech, and another condition may be used as long as a timing of a breakpoint of the speech of the user 2 can be detected.

(A) First Condition

Here, in a case in which a first condition listed above as (A) is used, "when a time of a pause of a speech exceeds a fixed time", a breakpoint of the speech is detected. FIG. 4 illustrates a specific example of this case.

Figure 4:
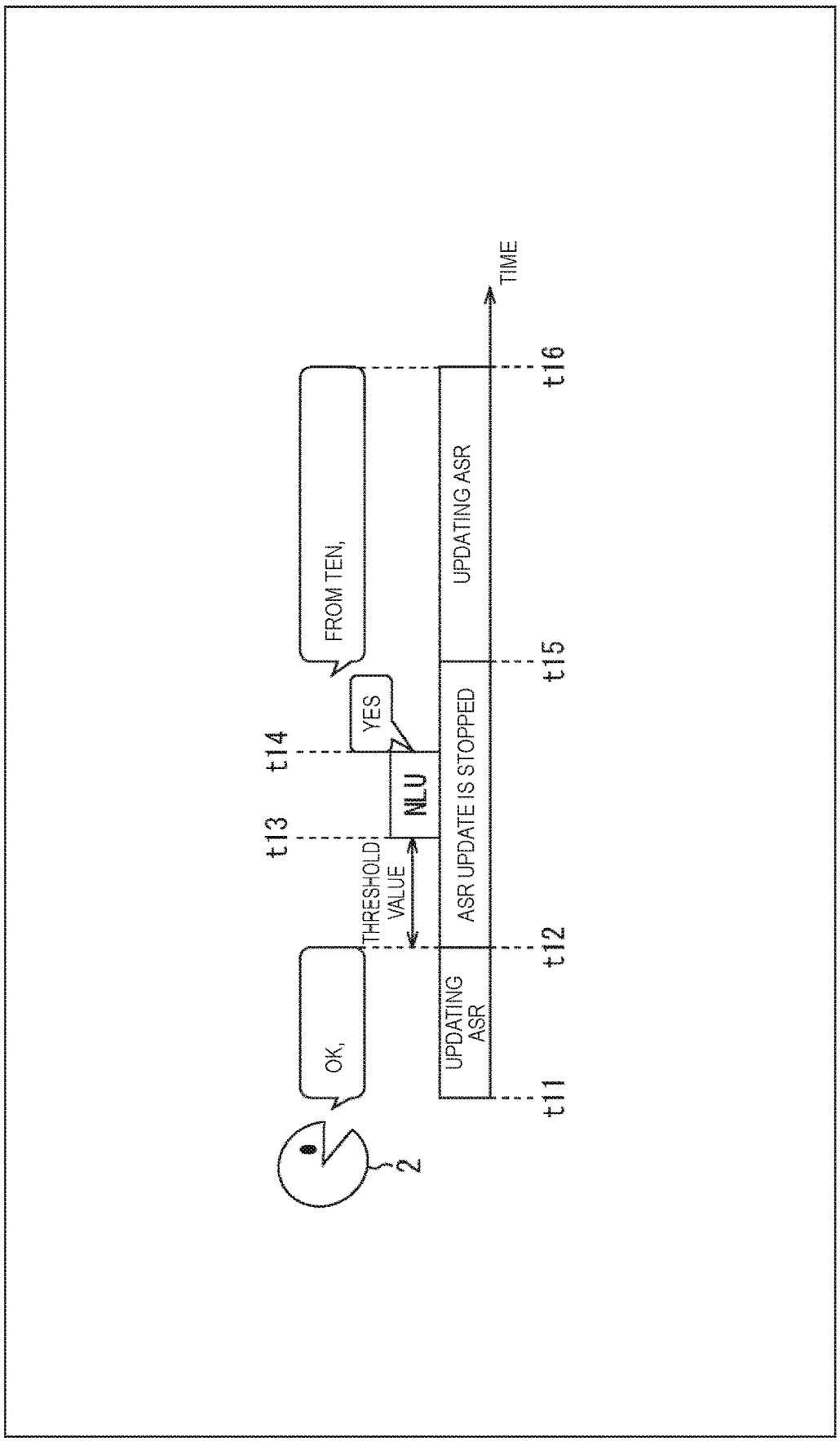
FIG. 4 is a diagram illustrating an example of detection of a breakpoint of a user speech that is performed in a case in which a first condition is used.

In FIG. 4, in a case in which the user 2 sequentially speaks "OK," and "from ten,", when a time from when a speech saying "OK," ends until a speech saying "from ten," is started exceeds a very small amount of time (e.g. about several hundreds of milliseconds), the speech dialogue system 1 detects a breakpoint of the speech of the user 2, and makes a response saying "Yes".

More specifically, in the speech dialogue system 1, results of speech recognition (ASR) (text data of speech) are sequentially output during the speech of the user 2, and in a case in which an interim result of text data (divided speech sentence) that is sequentially output as a result of speech recognition (ASR) has not been updated for a time exceeding a threshold value (e.g. 300 ms), a breakpoint of the speech is detected. Then, in a case in which a breakpoint of the speech is detected, the speech dialogue system 1 can obtain an intention (Intent) and entity information (Entity) as a result of semantic analysis (NLU) by inputting an interim result of text data (divided speech sentence) from a breakpoint position of the previous time to a breakpoint position of this time, to the semantic analysis processing.

In FIG. 4, in times t11 to t12, speech recognition processing is performed using the speech saying "OK,", and an output of a result of speech recognition (ASR) is updated, but the update of the output of the result of speech recognition (ASR) is stopped after the time t12, and the update of the output of the result of speech recognition (ASR) is not performed even if a time exceeds a threshold value (threshold value time). Thus, at a time 13, a breakpoint of the speech of the user 2 is detected, a divided speech sentence saying "OK." is input to the semantic analysis processing as an interim result of text data, and a result of semantic analysis (NLU) is obtained. Then, at a time 14, a response saying "Yes" is made.

After that, in times t15 to t16, speech recognition processing is performed using the speech saying "from ten,", and an output of a result of the speech recognition (ASR) is updated.

Figure 5:
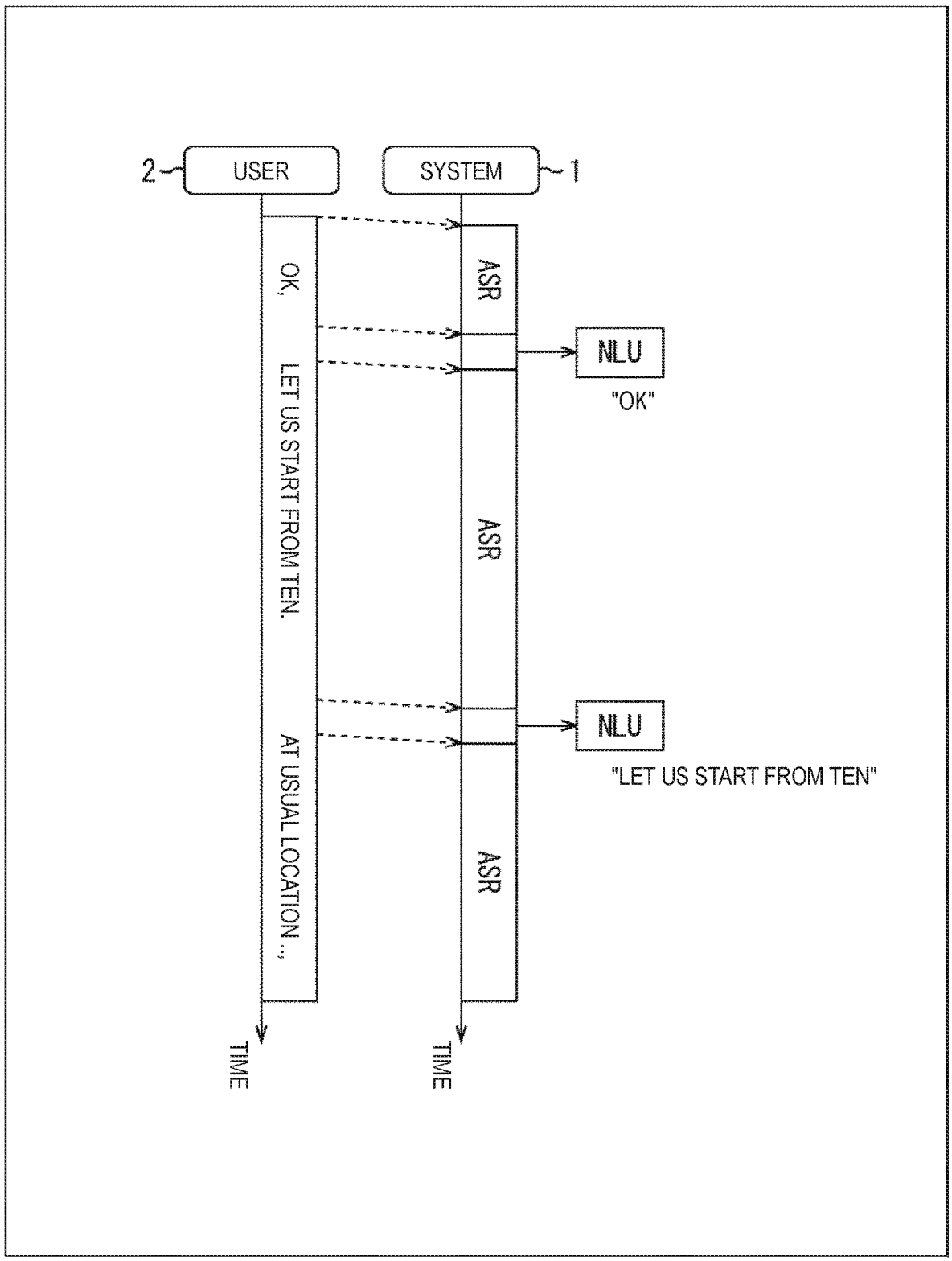
FIG. 5 is a diagram illustrating an example of detection of a breakpoint of a user speech that is performed in a case in which the first condition is used.

In addition, for example, in FIG. 5, in a case in which the user 2 performs a speech saying "OK, let us start from ten, at a usual location . . . ,", the speech dialogue system 1 detects a breakpoint of the speech that is indicated by a tiny pause, between "OK," and "let us start from ten," that are obtained as a result of the speech recognition (ASR). Then, in the speech dialogue system 1, a divided speech sentence saying "OK." is input to the semantic analysis processing, and a result of semantic analysis (NLU) is obtained.

In addition, the speech dialogue system 1 detects a breakpoint of the speech that is indicated by a tiny pause, between "let us start from ten," and "at a usual location . . . ," that are obtained as a result of the speech recognition (ASR). Then, in the speech dialogue system 1, a divided speech sentence saying "let us start from ten," is input to the semantic analysis processing, and a result of semantic analysis (NLU) is obtained.

Moreover, in a similar manner, after that, when a breakpoint of the speech saying "at a usual location . . . ," is detected, in the speech dialogue system 1, a divided speech sentence saying "at a usual location . . . ," is input to the semantic analysis processing, which is not illustrated in the drawing.

In this manner, in the case of using the above-described first condition (A), for example, when a time of a pause of the speech such as a tiny pause exceeds a fixed time during the speech of the user 2, the speech breakpoint detection unit 107 detects a breakpoint of the speech of the user 2 on the basis of a result of speech recognition performed by the speech recognition unit 104.

(B) Second Condition

In a case in which the above-described second condition (B) is used, "when a boundary of an intonation phrase is detected", a breakpoint of a speech is detected. FIG. 6 illustrates a specific example of this case.

Figure 6:
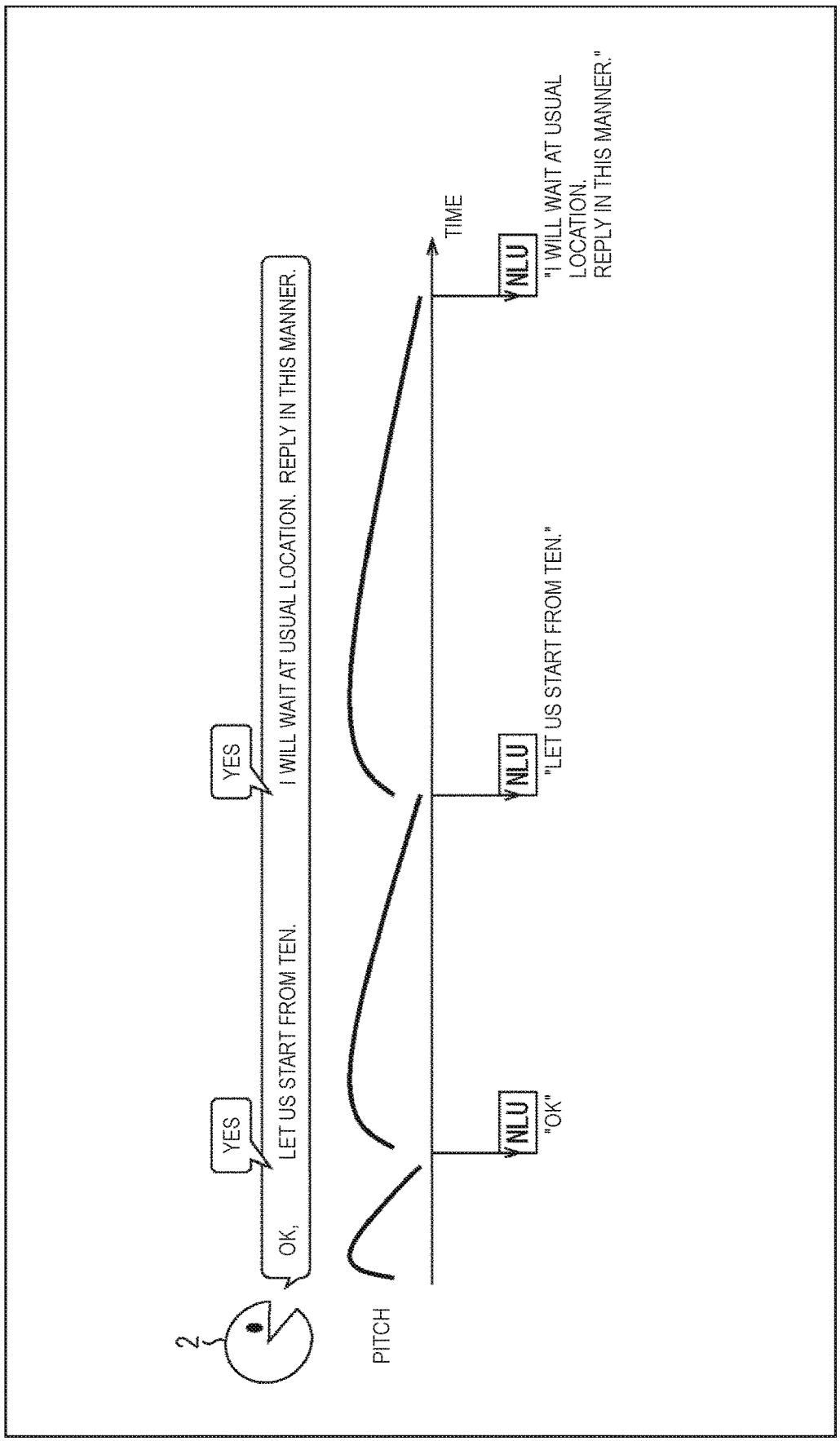
FIG. 6 is a diagram illustrating an example of detection of a breakpoint of a user speech that is performed in a case in which a second condition is used.

In FIG. 6, in a case in which the user 2 performs a speech saying "OK, let us start from ten. I will wait at a usual location. Reply in this manner.", the speech dialogue system 1 detects a boundary (intake of breath) of an intonation phrase on the basis of a natural decline of a pitch of the speech voice, between "OK," and "let us start from ten." that are obtained as a result of the speech recognition (ASR).

Here, as indicated by a waveform of "pitch" in FIG. 6, if attention is paid to the speech saying "OK,", because an envelope waveform of a pitch (e.g. corresponding to a tone pitch and a basic frequency FO) of the speech of the user 2 rises in pitch at the start of the speech, and naturally declines after an accent kernel, by detecting a natural decline of the pitch, it becomes possible to detect a boundary (intake of breath) of an intonation phrase.

Moreover, the basic frequency FO being a physical amount corresponding to a pitch tends to gradually decline along a time axis, and the tendency is referred to as a natural decline (Declination).

Then, in the speech dialogue system 1, a breakpoint of the speech is detected on the basis of the boundary of the intonation phrase of the speech saying "OK,", a divided speech sentence saying "OK," is input to the semantic analysis processing, and a result of the semantic analysis (NLU) is obtained.

In a similar manner, in addition, if attention is paid to speeches saying "let us start from ten" and "I will wait at a usual location. Reply in this manner.", in the speech dialogue system 1, a natural decline in pitch of each of these speeches is detected, and a breakpoint of the speech is detected on the basis of a boundary of an intonation phrase. Then, in the speech dialogue system 1, a divided speech sentence saying "let us start from ten" and a divided speech sentence saying "I will wait at a usual location. Reply in this manner." are sequentially input to the semantic analysis processing, and a result of the semantic analysis (NLU) is obtained for each of these divided speech sentences.

Moreover, also in FIG. 6, when a breakpoint of the speech of the user 2 is detected, a response saying "Yes" is made by the speech dialogue system 1.

In this manner, in the case of using the above-described second condition (B), for example, when a boundary (intake of breath) of an intonation phrase is detected during a speech of the user 2 on the basis of a result of speech recognition performed by the speech recognition unit 104, the speech breakpoint detection unit 107 detects a breakpoint of the speech of the user 2.

(C) Third Condition

In the case of using the above-described third condition (C), for example, when falter or filler (e.g. "er", "uh", etc.) is detected during a speech of the user 2 on the basis of a result of speech recognition performed by the speech recognition unit 104, the speech breakpoint detection unit 107 detects a breakpoint of the speech of the user 2.

Moreover, in a case in which English is used as a language other than Japanese, for example, when filler that uses a specific wording, such as "like", "you know", and "I mean" is detected, a breakpoint of the speech of the user 2 is detected.

(D) Fourth Condition

In the case of using the above-described fourth condition (D), for example, when aspiration (intake of breath) of the breathing user 2 is detected during a speech of the user 2 on the basis of a result of sensor recognition performed by the sensor recognition unit 106, the speech breakpoint detection unit 107 detects a breakpoint of the speech of the user 2. As a result of sensor recognition that is used here, for example, a result of recognition of sensor data obtained from the sensor unit 103 formed as a biosensor can be used.

(E) Fifth Condition

In the case of using the above-described fifth condition (E), for example, when a time in which a mouth of the user 2 does not move that is obtained from information regarding an image exceeds a fixed value (threshold value) during a speech of the user 2, the speech breakpoint detection unit 107 detects a breakpoint of the speech of the user 2 on the basis of a result of image recognition performed by the image recognition unit 105.

(F) Sixth Condition

In the case of using the above-described sixth condition (F), for example, when a big movement of a visual line (e.g. eye contact, etc.) of the user 2 is detected during a speech of the user 2 from information regarding an image, on the basis of a result of image recognition performed by the image recognition unit 105, the speech breakpoint detection unit 107 detects a breakpoint of the speech of the user 2.

(G) Seventh Condition

In the case of using the above-described seventh condition (G), for example, when a big movement of a part (e.g. neck, etc.) of a body of the user 2 is detected during a speech of the user 2 on the basis of a result of sensor recognition performed by the sensor recognition unit 106, the speech breakpoint detection unit 107 detects a breakpoint of the speech of the user 2. As a result of recognition that is used here, for example, a result of recognition of sensor data obtained from the sensor unit 103 formed as an acceleration sensor attached to the body of the user 2 such as a head can be used.

(Another Example of Speech Breakpoint Detection)

Moreover, as another condition other than the above-described conditions (A) to (G), for example, when a result of the following recognition is obtained, the speech dialogue system 1 may detect a breakpoint of a speech of the user 2 on the basis of the result of the recognition.

As a first another example, when the user 2 looks away from display information displayed on (the image output unit 115 of) the terminal device 10, or when the user 2 looks at these for confirmation, a breakpoint of a speech of the user 2 can be detected. Here, the display information includes information such as an icon (e.g. microphone icon) and a result of speech recognition of the user (e.g. a result of speech recognition (ASR) or semantic analysis (NLU)), for example.

As a second another example, when an amount of change in sound volume, tone pitch, or a rate of a speech of the user 2 is large, a breakpoint of the speech of the user 2 can be detected. Here, voice volume or the like corresponds to the sound volume, for example. In addition, an amount of change in the rate includes a voice rapidly turning to a loud voice or a quiet voice, tone changing, or a rate of speaking (speech speed) changing, for example.

As a third another example, when an expression of prolonging an end of a word is included in a speech of the user 2, a breakpoint of the speech of the user 2 can be detected. Here, the expression of prolonging an end of a word includes an expression in which a duration time of vowel is long, such as " . . . desah" or " . . . shitekarah" ("ah" indicates a prolonged sound), for example.

As a fourth another example, because a breakpoint of a speech that is based on a pattern of intonation sometimes varies depending on a language or a region, for example, an attribute of an area can be acquired from information regarding a user (e.g. login information of a service, etc.), and a breakpoint of a speech of the user 2 can be detected while varying a pattern to be adopted, depending on the area.

In addition, by a user individually setting a pattern of intonation in which a speech is separated on the basis of another factor, to a system, when the system is to be used in the next and subsequent times, a breakpoint of a speech may be detected using the personalized pattern.

Moreover, when speaking to another target other than the terminal device 10 (e.g. another user such as a family or a friend) is detected during a speech of the user 2 from a visual line or speech content, the speech dialogue system 1 may stop the detection and accumulation of a breakpoint of the speech on the basis of a result of the recognition, and may stop returning a response to the user 2.

(Use of Language Grammar)

In the speech dialogue processing, when a breakpoint of a speech is detected on the basis of a result of recognition of a state, a gesture, or the like of the speaking user 2, in a case in which an intention (Intent) fails to be obtained as a result of semantic analysis (NLU), due to a long divided speech sentence separated using only the state or the gesture of the user 2, division of a speech sentence that uses a language grammar may be used in combination.

For example, in a case in which a divided speech sentence separated on the basis of a result of recognition of a state, a gesture, or the like of the user 2 is input to the semantic analysis processing, and a reliability score of an intention (Intent) obtained as a result of the semantic analysis (NLU) is equal to or less than a fixed value, by inputting, to the semantic analysis processing, a divided speech sentence obtained by further performing division using, as a boundary, a part in the divided speech sentence in which a modification is distant, an intention (Intent) with a higher reliability score can be obtained.

For example, in a case in which the user 2 performs a speech saying "turn up sound volume and return to the beginning of music", when a breakpoint of the speech fails to be detected using the above-described conditions (when the detection accuracy of a breakpoint of the speech is bad), because a modification of a speech saying "return" is distant from a speech saying "turn up sound volume", using a language grammar, a breakpoint of the speech can be detected after the speech saying "turn up sound volume".

In the above-described manner, in the speech dialogue system 1, when a speech is started by the user 2, speech breakpoint detection processing is performed by the speech breakpoint detection unit 107 using one condition or a combination of a plurality of conditions among the above-described conditions such as the first to seventh conditions, for example. In addition, in the speech dialogue system 1, when a breakpoint of a speech is detected by the speech breakpoint detection processing, an interim result of text data (divided speech sentence) from a breakpoint position of the previous time to a breakpoint position of this time is input to the semantic analysis processing to be performed by the semantic analysis unit 108.

Then, in the speech dialogue system 1, until the speech is completed by the user 2, the semantic analysis processing of divided speech sentences is sequentially performed each time a breakpoint of the speech is detected, and a result (Intent, Entity) of semantic analysis (NLU) of each of the divided speech sentences that is to be accordingly obtained is recorded (accumulated).

In this manner, by sequentially performing the semantic analysis processing during a speech of the user 2, and recording (accumulating) a result (Intent, Entity) of semantic analysis (NLU) that is to be accordingly obtained, an effect of speeding up a response of the speech dialogue system 1, as compared with a case of performing semantic analysis processing of all speech sentences after the completion of a speech of the user 2 is obtained.

(Feedback Information Output Processing at Speech Breakpoint)

Next, the detailed content of feedback information output processing at a speech breakpoint that is to be executed by the sound effect replay unit 111, the speech synthesis processing unit 112, or the output image processing unit 113 will be described.

Meanwhile, by unconsciously performing a gesture of making a pause at a breakpoint for making speech intention understandable to other person, a person prompts a responsive action (e.g. back channeling, etc.) indicating the reception of the intention of the person.

In addition, a person performs a responsive action (e.g. back channeling, etc.) indicating the reception of an intention, at a timing at which the person can understand content being spoken by other person or the intention thereof. By the speech dialogue system 1 performing (simulating) an operation corresponding to the responsive action (comprehensive action) of the person, the user can receive, during a speech, a feedback indicating that the speech is understood by the system.

Here, in the speech dialogue system 1, a feedback is performed by outputting a voice or an image to the user 2 when a state or a gesture of the user for detecting a breakpoint of a speech is recognized. As a result, it becomes easier for the user 2 to speak subsequent speech content to the speech dialogue system 1.

For example, in FIGS. 4 and 6 described above, a case where the speech synthesis processing unit 112 outputs a back channeling saying "Yes", as a system speech, at a timing at which a breakpoint of a speech of the user 2 is detected has been exemplified. In the case of outputting such a back channeling as a response (system speech), while "Yes" indicating the reception may be output when an intention (Intent) is obtained as a result of semantic analysis (NLU) of each divided speech sentence corresponding to a breakpoint of a speech, "Pardon?" indicating that the speech cannot be understood may be output as a response (system speech), when an intention (Intent) is not obtained.

With this configuration, in a case in which the user 2 performs a speech to the speech dialogue system 1, when a back channeling of reception is performed from the speech dialogue system 1, the user 2 can perform a subsequent speech with an easy mind. On the other hand, when a back channeling indicating that the speech cannot be understood is performed from the speech dialogue system 1, it becomes possible for the user 2 to rephrase a speech using a different wording.

Moreover, the above-described "time when an intention (Intent) is not obtained as a result of semantic analysis (NLU) of each divided speech sentence" corresponds to a case where an intention is not an intention (Intent) that follows the context of a dialogue, a case where a reliability score of the intention (Intent) is lower than a fixed value (threshold value), or the like, for example.

In addition, in the above-described example, a case where a back channeling such as "Yes" is output as a response (system speech) has been described, but feedback information may be notified to the user 2 by outputting a sound effect such as "bleep", for example, by the sound effect replay unit 111.

At this time, in the sound effect replay unit 111, the type of sound effect may be varied between a time when an intention (Intent) is obtained as a result of semantic analysis (NLU) of each divided speech sentence, and a time when an intention (Intent) is not obtained as a result thereof and a speech fails to be understood.

Furthermore, feedback information may be notified to the user 2 by generating an image such as an avatar, for example, by the output image processing unit 113. Here, the notification is not limited to the display of an image, and another method may be used as long as the method can visually notify feedback information to the user 2, such as a lighting pattern of a light emitting diode (LED) or visual information that is based on a color, for example.

At this time, in the output image processing unit 113, the type of an image to be displayed may be varied between a time when an intention (Intent) is obtained as a result of semantic analysis (NLU) of each divided speech sentence, and a time when an intention (Intent) is not obtained as a result thereof and a speech fails to be understood.

Typically, the completion of a speech of the user 2 is determined on the speech dialogue system 1 side on the basis of the fact that the speech of the user 2 is not performed for about one second or more. By detecting a breakpoint of the speech of the user 2, the user 2 is assumed to be kept waiting a long time, and when the notification of feedback information is not issued from the speech dialogue system 1, there is a possibility that, during the completion waiting of the speech, the user 2 cannot see whether the speech of itself has been received, becomes anxious, and performs unnecessary rephrasing or the like.

For addressing this issue, by the sound effect replay unit 111, the speech synthesis processing unit 112, or the output image processing unit 113 performing feedback information output processing at a speech breakpoint, and feedback information being early output at the breakpoint of the speech of the user 2, the user 2 can recognize that the speech of itself has been received. As a result, the user 2 can avoid performing unnecessary rephrasing.

(Another Example of Feedback Information Output)

Moreover, the above-described feedback information output is an example, and in the speech dialogue system 1, various types of feedbacks can be employed as long as the feedbacks are performed in accordance with a speech of the user 2.

For example, feedback information may be notified by tactile sense by a device (e.g. smartphone, wearable device, etc.) worn by the user 2 vibrating. At this time, the type of vibration may be varied in accordance with the content of a feedback. Furthermore, in addition, stimulus may be applied by flowing fine current to the body of the user 2.

In addition, for example, in a case in which a breakpoint of a speech is not detected for a certain period of time from a previous breakpoint position, and a speech time is recognized to be long, feedback information for prompting the user 2 to make a breakpoint of the speech may be presented. With this configuration, feedback information can be early presented, and a division unit of a divided speech sentence can be made small. Thus, analysis accuracy of subsequent semantic analysis processing to be performed by the semantic analysis unit 108 can be enhanced.

Here, as a method for early presenting feedback information, for example, by an anthropomorphic agent displayed on the image output unit 115 nodding when a speech time of the user 2 is long, it is possible to prompt the user 2 to make a breakpoint of a speech. Moreover, the anthropomorphic agent is an anthropomorphic speech dialogue agent that performs a speech dialogue with a user using a moving image of a computer graphics (CG) character, a video avatar, or the like, for example.

(Intention Estimation Processing and Task Execution Processing)

Next, the detailed content of intention estimation processing to be executed by the plural intention estimation unit 109, and task execution processing to be executed by the task execution unit 110 will be described with reference to FIGS. 7 to 10.

The plural intention estimation unit 109 estimates the intention of the user 2 by performing intention estimation processing on the basis of a recorded (accumulated) result (Intent. Entity) of semantic analysis (NLU). In addition, the task execution unit 110 executes a task of the system by performing task execution processing on the basis of a result of intention estimation of the user 2.

(First Example of User Intention Estimation)

Figure 7:
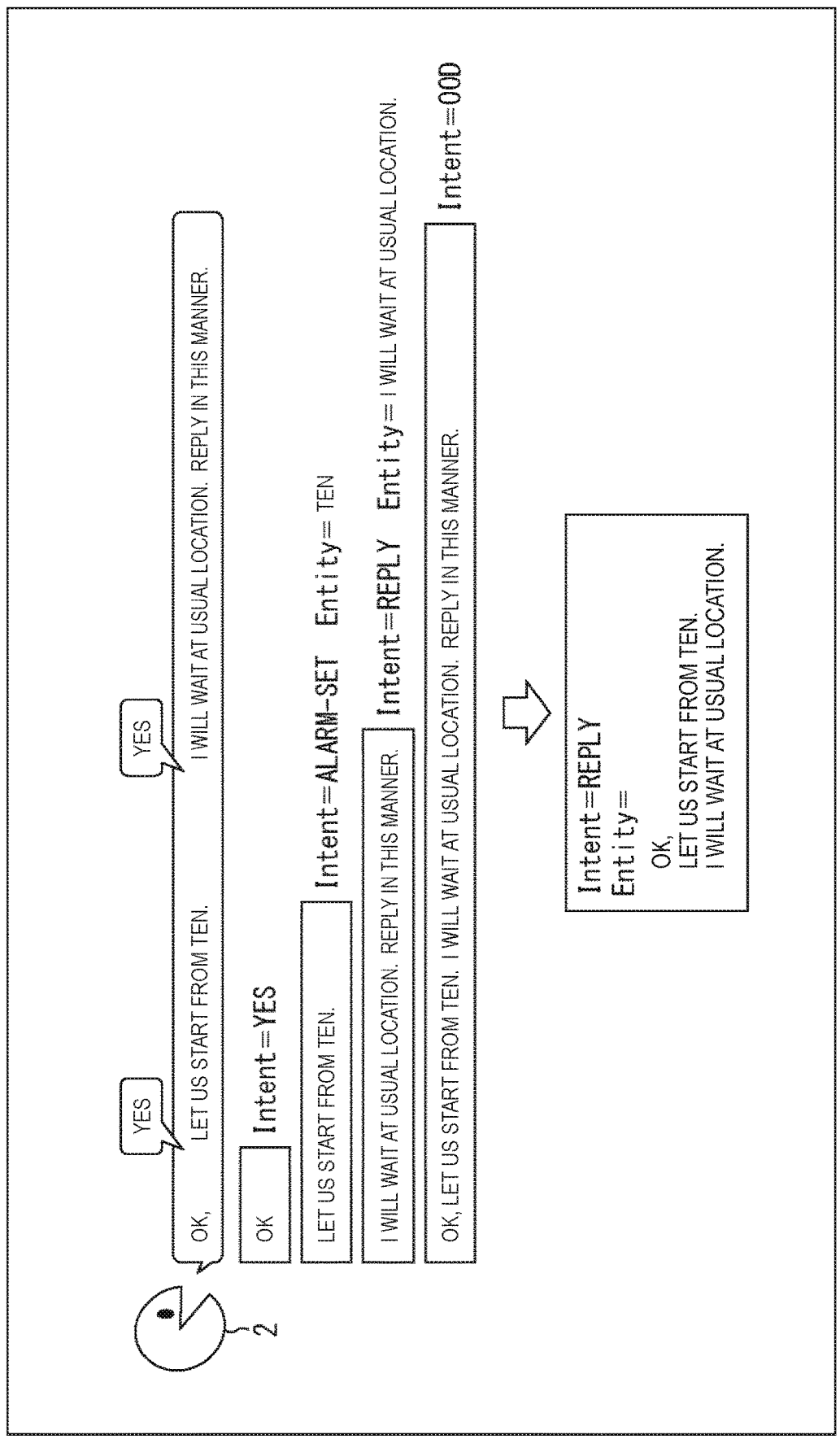
FIG. 7 is a diagram illustrating a first example of intention estimation of a user.

FIG. 7 illustrates a first example of intention estimation of the user 2.

In FIG. 7, the user 2 is performing a speech saying "OK, let us start from ten. I will wait at a usual location. Reply in this manner.". In a conventional speech dialogue system, because semantic analysis processing is performed on the entire speech sentence, a plurality of different intentions is included in the speech sentence, and a result of semantic analysis (NLU) becomes Out Of Domain (OOD). Here, the OOD means that a reliability score obtained as a result of the semantic analysis processing is low and a correct result is not obtained.

On the other hand, in the speech dialogue system 1, a breakpoint of the speech is detected after a speech saying "OK", and a first divided speech sentence (text data) saying "OK" is input to semantic analysis processing. Then, by the semantic analysis processing, Intent="YES" is obtained as a result of semantic analysis (NLU) of the first divided speech sentence.

At this time, in the speech dialogue system 1, because the breakpoint of the speech saying "OK" is detected, a response (back channeling) saying "Yes" is made to the user 2.

Next, in the speech dialogue system 1, after a speech saying "let us start from ten" following the speech saying "OK", a breakpoint of the speech is detected, and a second divided speech sentence (text data) saying "let us start from ten" is input to semantic analysis processing. By the semantic analysis processing, Intent="ALARM-SET" and Entity="ten" are obtained as a result of semantic analysis (NLU) of the second divided speech sentence.

At this time, in the speech dialogue system 1, because the breakpoint of the speech saying "let us start from ten" is detected, a response (back channeling) saying "Yes" is made to the user 2.

Next, in the speech dialogue system 1, after a speech saying "I will wait at a usual location. Reply in this manner." following the speech saying "let us start from ten", a breakpoint of the speech is detected, and a third divided speech sentence (text data) saying "I will wait at a usual location. Reply in this manner." is input to semantic analysis processing. By the semantic analysis processing. Intent="REPLY" and Entity="I will wait at a usual location" are obtained as a result of semantic analysis (NLU) of the third divided speech sentence.

Then, in the speech dialogue system 1, because the result of semantic analysis (NLU) of the third divided speech sentence shows Intent="REPLY" and Entity="I will wait at a usual location", it can be estimated by the plural intention estimation unit 109 that the preceding first divided speech sentence and the second divided speech sentence also have content of reply ("REPLY") similarly to the third divided speech sentence. More specifically, for example, in the case of Japanese, because a predicate comes to the end of a speech, here, reply ("REPLY"), which is an intention (Intent) of the third divided speech sentence, is estimated to be an intention of the entire speech.

With this configuration, the plural intention estimation unit 109 can obtain Intent="REPLY" and Entity="OK"+"let us start from ten"+"I will wait at a usual location", as a result of intention estimation of the entire speech of the user 2. The result of intention estimation of the entire speech can be said to be appropriate as a result that follows the intention of the user 2, in view of the content of the speech saying "OK, let us start from ten at a usual location. "I will wait at a usual location. Reply in this manner.".

After that, on the basis of the result of intention estimation performed by the plural intention estimation unit 109, the task execution unit 110 controls each unit (e.g. message generation unit, communication I/F, etc.) of the terminal device 10 or the server 20, and performs processing of returning a message saying "OK, let us start from ten at a usual location. "I will wait at a usual location.". In this manner, in (the task execution unit 110 of) the speech dialogue system 1, a task being "reply of a message" is executed in accordance with the speech of the user 2.

Moreover, in the example of FIG. 7, a task being "reply of a message" has been described, but the task is not limited to this, and for example, in the speech dialogue system 1, the above-described configuration can also be similarly applied to the case of executing another task such as "creation of a message".

(Second Example of User Intention Estimation)

Figure 8:
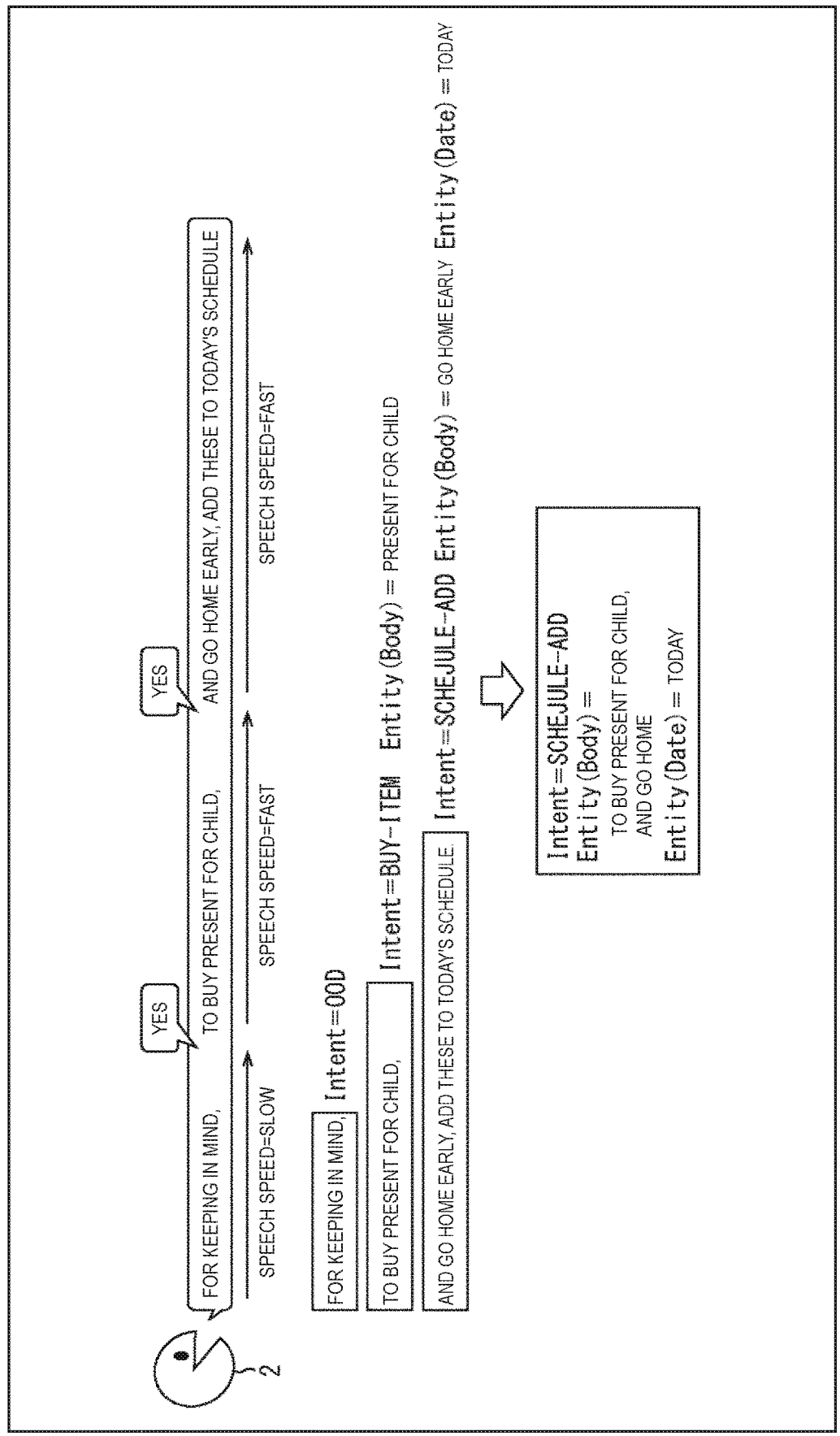
FIG. 8 is a diagram illustrating a second example of intention estimation of a user.

FIG. 8 illustrates a second example of intention estimation of the user 2.

In FIG. 8, the user 2 is performing a speech saying "For keeping in mind, to buy a present for a child, and go home early, add these to today's schedule".

The speech dialogue system 1 detects a breakpoint of the speech after a speech saying "For keeping in mind", and a first divided speech sentence saying "For keeping in mind" is input to semantic analysis processing. By the semantic analysis processing, Intent=OOD is obtained as a result of semantic analysis (NLU) of the first divided speech sentence.

In addition, at this time, the speech dialogue system 1 analyzes voice data of the speech saying "For keeping in mind", and determines that a rate of the speech (speech speed) is "slow". These analysis results (Intent, speech speed) are recorded into the storage unit 116.

Next, the speech dialogue system 1 detects a breakpoint of the speech after a speech saying "to buy a present for a child" following the speech saying "For keeping in mind", and a second divided speech sentence saying "to buy a present for a child" is input to semantic analysis processing. By the semantic analysis processing, Intent="BUY-ITEM" and Entity="present for child" are obtained as a result of semantic analysis (NLU) of the second divided speech sentence.

Here. "present for child" is regarded as an Entity of a Body type. Moreover, Body represents content of a speech, and an Entity of a Body type includes a free speech.

In addition, at this time, the speech dialogue system 1 analyzes voice data of the speech saying "to buy a present for a child", and determines that a rate of the speech (speech speed) is "fast". These analysis results (Intent, Entity, speech speed) are recorded into the storage unit 116.

Next, the speech dialogue system 1 detects a breakpoint of the speech after a speech saying "and go home early, add these to today's schedule" following the speech saying "to buy a present for a child", and a third divided speech sentence saying "and go home early, add these to today's schedule" is input to semantic analysis processing. By the semantic analysis processing. Intent="SCHEJULE-ADD", Entity="go home early", and Entity="today" are obtained as a result of semantic analysis (NLU) of the third divided speech sentence. Nevertheless, among the Entities, "go home early" is regarded as an Entity of a Body type, and "today" is regarded as an Entity of a Date type.

In addition, at this time, the speech dialogue system 1 analyzes voice data of the speech saying "and go home early, add these to today's schedule", and determines that a rate of the speech (speech speed) is "fast". These analysis results (Intent, Entity, speech speed) are recorded into the storage unit 116.

Moreover, similarly to the above-described example, the speech dialogue system 1 makes a response (back channeling) saying "Yes" to the user 2 when a breakpoint of the speech of the user 2 is detected.

Then, in the speech dialogue system 1, the plural intention estimation unit 109 estimates the intention of the speech of the user 2 on the basis of a result (Intent, Entity) of semantic analysis (NLU) of each divided speech sentence obtained by dividing the speech of the user 2 into three, and a rate of speech (speech speed) of each divided speech sentence, which are recorded in the storage unit 116.

In the intention estimation processing, because an Entity of a Body type for an intention (Intent) of the third divided speech sentence being the last divided speech sentence is "go home early", the third divided speech sentence has an intention (Intent) including an Entity of a Body type, and a speech speed of "to buy a present for a child" being the second divided speech sentence provided one ahead thereof is determined to be "fast", the result of semantic analysis (NLU) of the second divided speech sentence is processed in the following manner.

More specifically, in the intention estimation processing, an intention (Intent) of the second divided speech sentence is rejected, and the speech content is added to an Entity of a Body type of Intent="SCHEJULE-ADD" being an intention (Intent) of the third divided speech sentence.

In addition, in the intention estimation processing, because a speech speed of "For keeping in mind" being the first divided speech sentence (top divided speech sentence) further preceding thereto is determined to be "slow", an intention (Intent) of the first divided speech sentence is prevented from being added to the Entity of a Body type of the third divided speech sentence.

With this configuration, the plural intention estimation unit 109 can obtain Intent="SCHEJULE-ADD", Entity of Body type="buy a present for a child"+"go home early", and Entity of Date type="today" as a result of intention estimation of the entire speech of the user 2. The intention estimation of the entire speech can be said to be appropriate as a result that follows the intention of the user 2, in view of the content of the speech saying "For keeping in mind, to buy a present for a child, and go home early, add these to today's schedule".

After that, on the basis of the result of intention estimation performed by the plural intention estimation unit 109, the task execution unit 110 controls each unit (e.g. schedule management unit, etc.) of the terminal device 10 or the server 20, and performs processing of registering a schedule item being "to buy a present for a child, and go home early" into a schedule as a schedule item of "today". In this manner, in (the task execution unit 110 of) the speech dialogue system 1, a task being "registration of a schedule" is executed in accordance with the speech of the user 2.

Moreover, in the second example, in the intention estimation processing, a rate of speech (speech speed) is used when a portion of a Body is determined from a plurality of results of semantic analysis (NLU), and the portion is added to the content of a schedule, but another type of information may be used as long as whether or not to add as a portion of a Body can be determined on the basis of the information.

(Third Example of User Intention Estimation)

Figure 9:
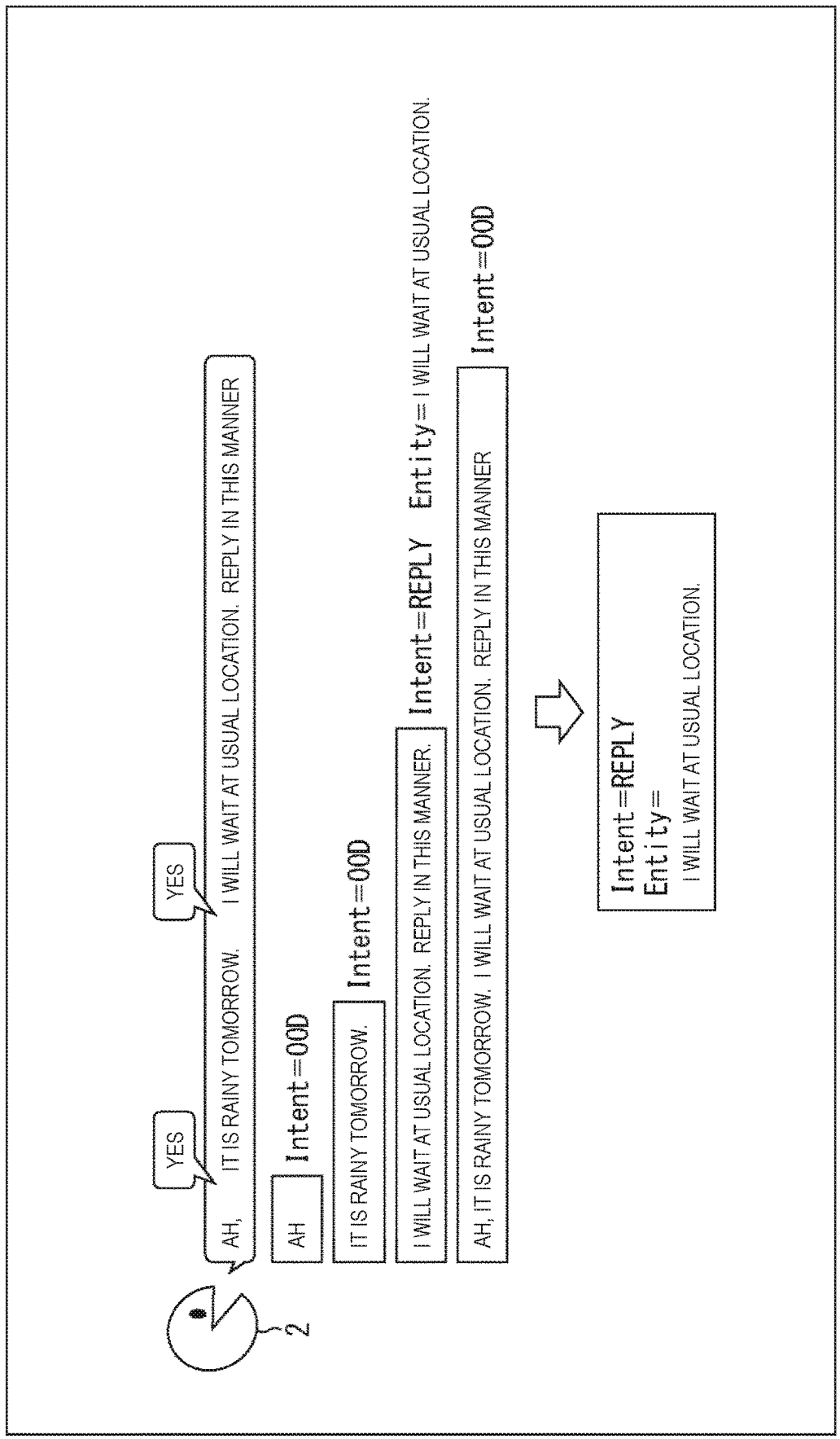
FIG. 9 is a diagram illustrating a third example of intention estimation of a user.

FIG. 9 illustrates a third example of intention estimation of the user 2.

In FIG. 9, the user 2 is performing a speech saying "Ah, it is rainy tomorrow. I will wait at a usual location. Reply in this manner".

The speech dialogue system 1 detects a breakpoint of the speech after a speech saying "Ah", and a first divided speech sentence saying "Ah" is input to semantic analysis processing. By the semantic analysis processing, Intent=OOD is obtained as a result of semantic analysis (NLU) of the first divided speech sentence.

In addition, at this time, the speech dialogue system 1 analyzes image data obtained during the speech saying "Ah", and determines that the user 2 "looks away from" the terminal device 10 during the speech. These analysis results (Intent, visual line) are recorded into the storage unit 116.

Next, the speech dialogue system 1 detects a breakpoint of the speech after a speech saying "it is rainy tomorrow" following the speech saying "Ah", and a second divided speech sentence saying "it is rainy tomorrow" is input to semantic analysis processing. By the semantic analysis processing, Intent=OOD is obtained as a result of semantic analysis (NLU) of the second divided speech sentence.

In addition, at this time, the speech dialogue system 1 analyzes image data obtained during the speech saying "it is rainy tomorrow", and determines that the user 2 "looks away from" the terminal device 10 during the speech. These analysis results (Intent, visual line) are recorded into the storage unit 116.

Next, the speech dialogue system 1 detects a breakpoint of the speech after a speech saying "I will wait at a usual location. Reply in this manner" following the speech saying "it is rainy tomorrow", and a third divided speech sentence saying "I will wait at a usual location. Reply in this manner" is input to semantic analysis processing. By the semantic analysis processing, Intent="REPLY" and Entity="I will wait at a usual location" are obtained as a result of semantic analysis (NLU) of the third divided speech sentence.

In addition, at this time, the speech dialogue system 1 analyzes image data obtained during the speech saying "I will wait at a usual location. Reply in this manner", and determines that the user 2 "looks at" the terminal device 10 during the speech. These analysis results (Intent, Entity, visual line) are recorded into the storage unit 116.

Then, in the speech dialogue system 1, the result of semantic analysis (NLU) of the third divided speech sentence that is obtained by the plural intention estimation unit 109 shows Intent="REPLY", Entity="I will wait at a usual location", but because it is determined that the user "looks away" during the speech "it is rainy tomorrow" being the second divided speech sentence provided one ahead thereof, an intention (Intent) of the second divided speech sentence is prevented from being added to an Entity of a Body type of the third divided speech sentence.

In a similar manner, in addition, because it is determined that the user "looks away" during the speech "Ah" being the first divided speech sentence (top divided speech sentence) further preceding thereto, an intention (Intent) of the first divided speech sentence is prevented from being added to the Entity of a Body type of the third divided speech sentence.

With this configuration, the plural intention estimation unit 109 can obtain Intent="REPLY" and Entity of Body type="I will wait at a usual location" as a result of intention estimation of the entire speech of the user 2. The intention estimation of the entire speech can be said to be appropriate as a result that follows the intention of the user 2, in view of the content of the speech saying "Ah, it is rainy tomorrow. I will wait at a usual location. Reply in this manner", because "Ah, it is rainy tomorrow" is monology of the user 2.

After that, on the basis of the result of intention estimation performed by the plural intention estimation unit 109, the task execution unit 110 controls each unit (e.g. message generation unit, communication I/F, etc.) of the terminal device 10 or the server 20, and performs processing of returning a message saying "I will wait at a usual location". In this manner, in (the task execution unit 110 of) the speech dialogue system 1, a task being "reply of a message" is executed in accordance with the speech of the user 2.

Moreover, in the third example, in the intention estimation processing, a visual line is used when a portion of a Body is determined from a plurality of results of semantic analysis (NLU), and the portion is added to the content of a schedule, but another type of information may be used as long as whether or not to add as a portion of a Body can be determined on the basis of the information.

(Fourth Example of User Intention Estimation)

Figure 10:
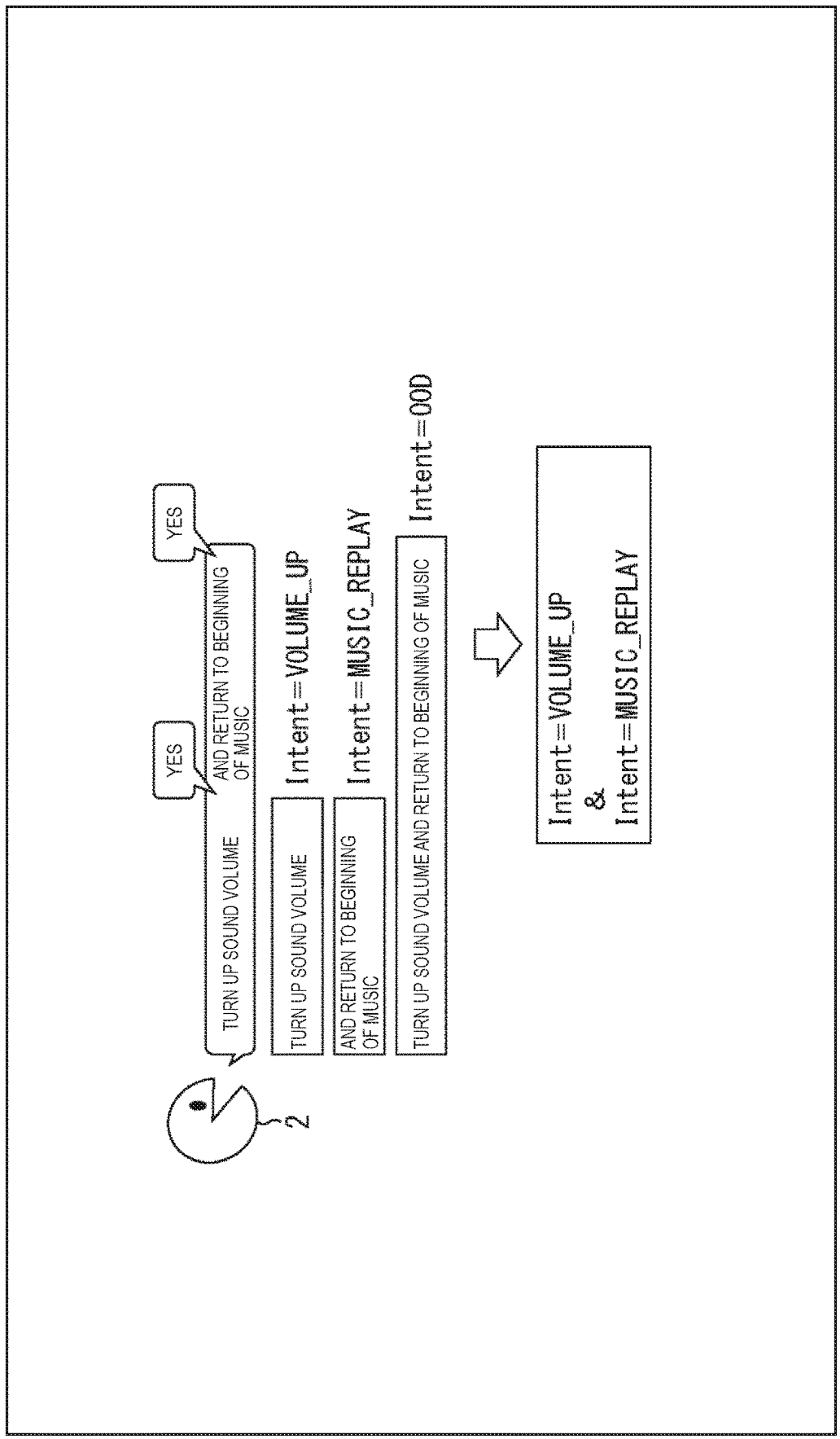
FIG. 10 is a diagram illustrating a fourth example of intention estimation of a user.

FIG. 10 illustrates a fourth example of intention estimation of the user 2.

In FIG. 10, the user 2 is performing a speech saying "turn up sound volume and return to the beginning of music". In a conventional speech dialogue system, semantic analysis processing is performed on the entire speech sentence, but because a plurality of different intentions is included in the speech sentence, Intent=OOD is obtained as a result of semantic analysis (NLU).

On the other hand, the speech dialogue system 1 detects a breakpoint of the speech after a speech saying "turn up sound volume", and a first divided speech sentence saying "turn up sound volume" is input to semantic analysis processing. Then, by the semantic analysis processing, Intent="VOLUME_UP" is obtained as a result of semantic analysis (NLU) of the first divided speech sentence.

At this time, in the speech dialogue system 1, because the breakpoint of the speech saying "turn up sound volume" is detected, a response (back channeling) saying "Yes" is made to the user 2.

In addition, the speech dialogue system 1 detects a breakpoint of the speech after a speech saying "and return to the beginning of music" following the speech saying "turn up sound volume", and a second divided speech sentence saying "and return to the beginning of music" is input to semantic analysis processing. Then, by the semantic analysis processing, Intent="MUSIC_REPLAY" is obtained as a result of semantic analysis (NLU) of the second divided speech sentence.

At this time, in the speech dialogue system 1, because the breakpoint of the speech saying "and return to the beginning of music" is detected, a response (back channeling) saying "Yes" is made to the user 2.

Then, in the speech dialogue system 1, because the result of semantic analysis (NLU) of the first divided speech sentence that is obtained by the plural intention estimation unit 109 shows Intent="VOLUME_UP", and the result of semantic analysis (NLU) of the second divided speech sentence that is obtained by the plural intention estimation unit 109 shows Intent="MUSIC_REPLAY", it can be estimated that two intentions (Intents) are included in the speech of the user 2.

With this configuration, the plural intention estimation unit 109 can obtain two intentions (Intents) including Intent="VOLUME_UP" and "MUSIC_REPLAY" as a result of intention estimation of the entire speech of the user 2. The result of intention estimation of the entire speech can be said to be appropriate as a result that follows the intention of the user 2, in view of the content of the speech saying "turn up sound volume and return to the beginning of music".

On the basis of the result of intention estimation performed by the plural intention estimation unit 109, the task execution unit 110 performs processing of turning up sound volume and replaying the music after returning the music to the beginning, by controlling the voice output unit 114 or the like of the terminal device 10. In this manner, in (the task execution unit 110 of) the speech dialogue system 1, it becomes possible to collectively execute a first task of "turning up sound volume" corresponding to an intention (Intent) being "VOLUME_UP", and a second task of "replaying the music after returning the music to the beginning" corresponding to an intention (Intent) being "MUSIC_REPLAY", in accordance with the intention of the user 2.

Moreover, in the example of FIG. 10, a request for a music replay operation has been described, but the intention is not limited to this, and the application of this method is enabled in a case in which a speech of the user 2 includes a plurality of request intentions to the system in the speech dialogue system 1, for example.

(Other Examples of Intention Estimation Processing and Task Execution Processing)

As the above-described first example of user intention estimation in FIG. 7, an example of executing tasks of reply and creation of a message has been described, and the tasks of reply and creation of a message may be applied to another function such as a message function of an agent.

For example, in a case in which a speech (message) saying "convey that "there is a piece of cake for afternoon tea in a refrigerator"" is performed by the user 2 to the speech dialogue system 1, by recording, as a message body text, a speech voice of a portion "there is a piece of cake for afternoon tea in a refrigerator" in the speech that corresponds to a breakpoint of a speech, only a voice of the message body text may be replayed to another user (e.g. family).

In addition, there is a possibility that the user 2 makes a speech error during a speech. Thus, cancel, undo, and retraction for the speech error made during the speech may be performed in a division unit of the speech.

Here, two specific examples of a cancel function in a division unit of a speech will be described, and in a dialogue, a speech of the user 2 will be described as "U (User)" and a response (execution of task) made by the speech dialogue system 1 will be described as "S (System)". In addition, "/" represents a breakpoint position of a speech that has been detected by speech breakpoint detection processing.

First Example

U: "set an alarm for tomorrow/to seven/no, it is wrong/to six"

S: (execute a task of "setting an alarm" to "six a.m. tomorrow")

In the case of the first example, the speech dialogue system 1 cancels a divided speech sentence saying "to seven" corresponding to a breakpoint of a speech provided immediately before a divided speech sentence saying "no, it is wrong", and sets an alarm to six a.m. tomorrow using a divided speech sentence saying "to six" corresponding to a breakpoint of a speech provided immediately after the divided speech sentence saying "no, it is wrong".

In other words, here, among results of semantic analysis (NLU) obtained for the respective divided speech sentences, "seven" serving as entity information (Entity) is corrected to "six" with an intention (Intent) being alarm setting ("ALARM-SET") remaining unchanged.

Second Example

U: "Add to a shopping list/egg/carrot/no, cancel this/radish"
S: (execute a task of "adding "egg" and "radish" to a shopping list")

In the case of the second example, the speech dialogue system 1 cancels a divided speech sentence saying "carrot" corresponding to a breakpoint of a speech provided immediately before a divided speech sentence saying "no, cancel this", and adds egg and radish to a shopping list using a divided speech sentence saying "radish" corresponding to a breakpoint of a speech provided immediately after the divided speech sentence saying "no, cancel this".

In other words, here, among results of semantic analysis (NLU) obtained for the respective divided speech sentences, "carrot" serving as entity information (Entity) is corrected to "radish" with an intention (Intent) being shopping schedule ("SCHEJULE-ADD") remaining unchanged.

(Statistical Analysis)

In the speech dialogue system 1, because a result (Intent, Entity) of semantic analysis (NLU) is obtained for each divided speech sentence, for example, a relative co-occurrence frequency of a plurality of intentions (Intents) may be statistically analyzed, and the analysis result may be used in intention estimation processing.

For example, when a speech saying "turn up sound volume and replay music xx" is performed by the user 2, on the basis of respective results of semantic analysis (NLU) of a first divided speech sentence saying "turn up sound volume", and a second divided speech sentence saying "and replay music xx", a relative co-occurrence frequency of Intent=VOLUME_UP+PLAY_MUSIC can be statistically learned.

In addition, in the speech dialogue system 1, by recording, as collected data, data such as a result (Intent, Entity) of semantic analysis (NLU) of each divided speech sentence that is to be recorded into the storage unit 116, it can be learned that a speech with an intention (Intent) being PLAY_MUSIC is likely to be performed after a speech with an intention (Intent) being VOLUME_UP, for example, by statistically analyzing the collected data.

Then, for example, when a speech saying "turn up sound volume and replay xx" is performed by the user 2, Intent=VOLUME_UP+OOD is assumed to be obtained as respective results of semantic analysis (NLU) of a first divided speech sentence saying "turn up sound volume", and a second divided speech sentence saying "and replay xx". Here, because a reliability score of Intent=PLAY_MUSIC is low, an intention (Intent) of the second divided speech sentence is OOD.

At this time, in (the plural intention estimation unit 109 of) the speech dialogue system 1, a result of intention estimation in which an intention is determined to be not OOD but an intention of PLAY_MUSIC is obtained, by adding a value corresponding to a co-occurrence frequency, to the reliability score of PLAY_MUSIC determined to be OOD, using a result of learning performed in advance, and correcting the reliability score (by the reliability score increasing because of a high co-occurrence frequency of PLAY_MUSIC after VOLUME_UP). With this configuration, in (the task execution unit 110 of) the speech dialogue system 1, replay of music is also performed together with turning up sound volume.

Moreover, in a case in which the storage unit 116 is provided in the server 20, because results (Intent, Entity) of semantic analysis (NLU) corresponding to speeches not only of a certain specific user but also of a number of users using a speech dialogue service can be accumulated as collected data, more accurate machine learning can be performed using a larger number of collected data.

More specifically, the above-described statistical co-occurrence frequency may be collected for all the users and applied, the above-described statistical co-occurrence frequency may be collected for each user attribute (e.g. area, age group, gender, etc.) and applied, or the above-described statistical co-occurrence frequency may be collected for a certain specific user and applied.

In addition, in the above-described example, the case of n=2 of n-gram statistics has been described, but frequencies may be statistically analyzed by increasing the number of co-occurrence relations like n=3, n=4, and so on, for example.

By performing such statistical analysis, for example, an amount of data to be collected increases along with used hours of the system, and a result of semantic analysis (NLU) of each divided speech sentence is obtained also from a long sentence, a complex sentence, and the like that are to be spoken by the user. The user can thereby realize that the accuracy of intention estimation in intention estimation processing increases, and the system becomes wiser as the system is used more.

(Flow of Body Determination Processing of Entire Speech)

Figure 11:
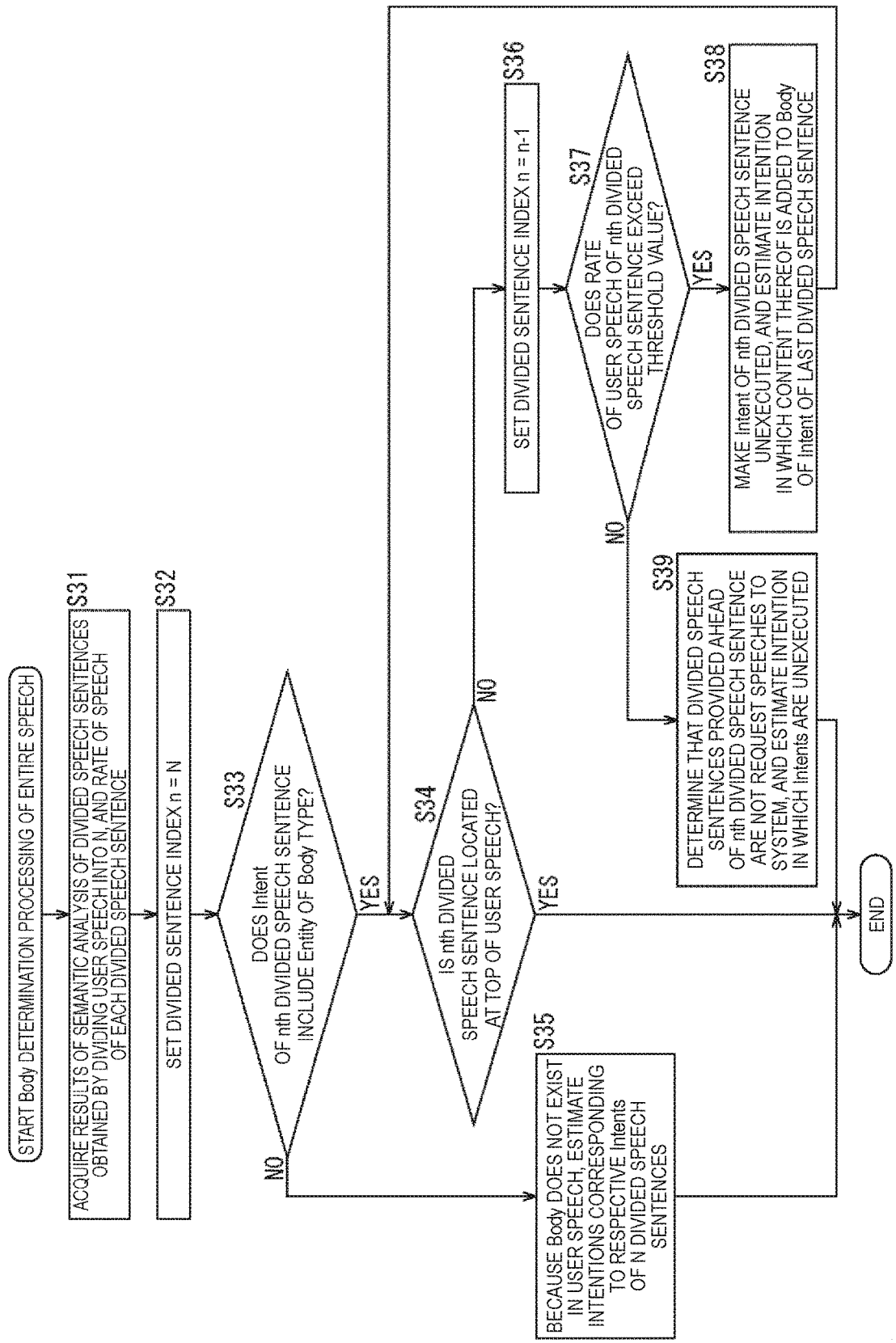
FIG. 11 is a flowchart describing a flow of Body determination processing of the entire speech.

Next, a flow of Body determination processing of the entire speech that is to be executed by the speech dialogue system 1 will be described with reference to a flowchart in FIG. 11.

Figure 3:
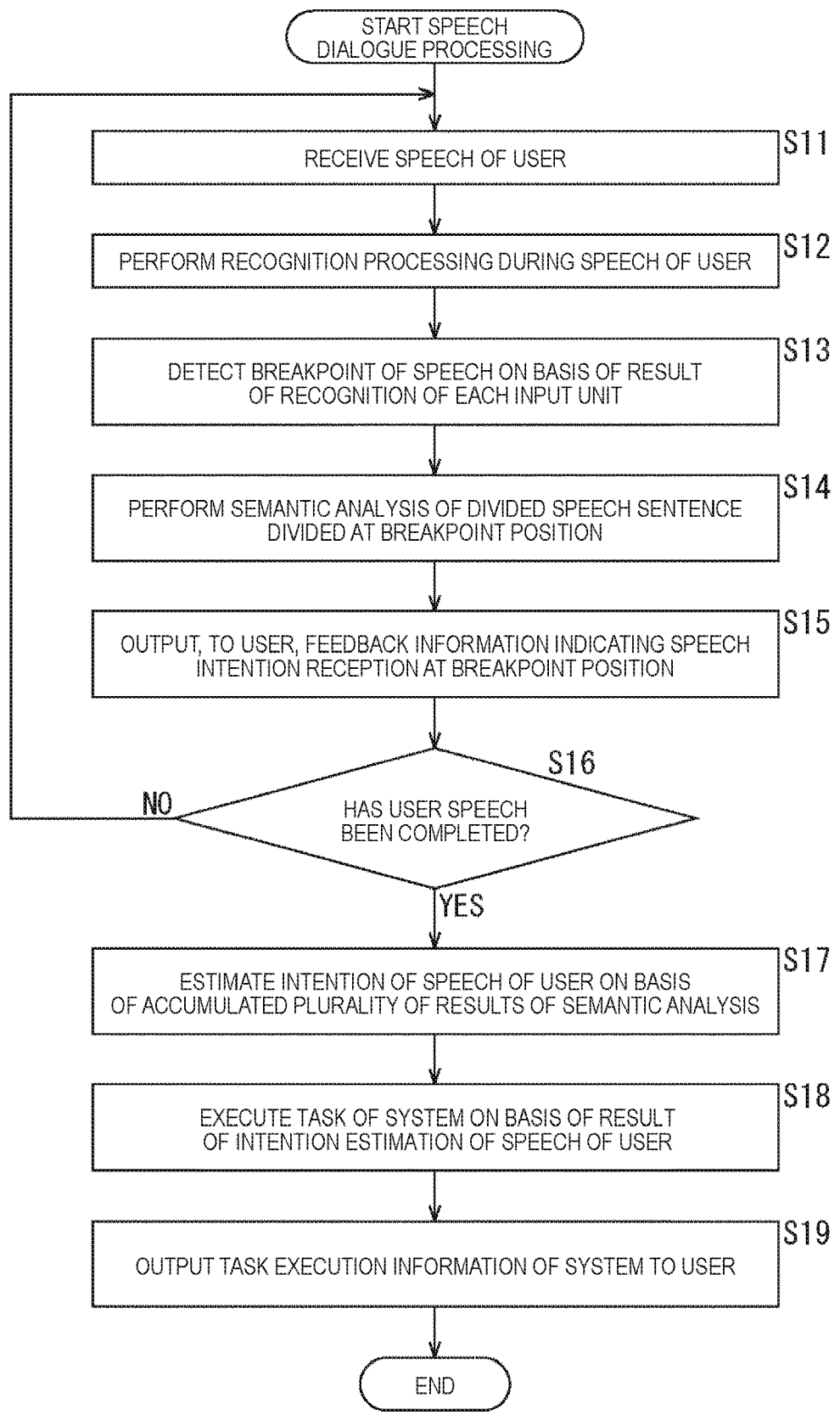
FIG. 3 is a flowchart describing a flow of a speech dialogue processing.

Moreover, the Body determination processing of the entire speech is included in the process in step S17 that is to be performed after the processes in steps S11 to S16 in the speech dialogue processing in FIG. 3 are repeatedly performed, and results of semantic analysis (NLU) of respective divided speech sentences are obtained.

In step S31, the plural intention estimation unit 109 acquires results of semantic analysis (NLU) of divided speech sentences obtained by dividing a speech of the user 2 into N, and a rate of speech (speech speed) of each divided speech sentence, which are recorded in the storage unit 116. Here, N denotes an integer of 1 or more.

In step S32, the plural intention estimation unit 109 sets n=N as a divided sentence index n. Here, by setting n=N, a processing target is set to the last divided speech sentence.

In step S33, the plural intention estimation unit 109 determines whether or not an intention (Intent) of an nth divided speech sentence includes entity information (Entity) of a Body type.

In a case in which it is determined in step S33 that the intention (Intent) of the nth divided speech sentence does not include entity information (Entity) of a Body type, the processing is advanced to step S35.

In step S35, because entity information (Entity) of a Body type does not exist in the speech of the user 2, the plural intention estimation unit 109 estimates intentions corresponding to respective intentions (Intents) of N divided speech sentences. With this configuration, on the basis of results of intention estimation from the plural intention estimation unit 109, the task execution unit 110 executes tasks corresponding to the respective intentions (Intents) of the N divided speech sentences.

A case where the process in step S35 is executed corresponds to the fourth example of user intention estimation illustrated in FIG. 10, for example. In FIG. 10, as results of intention estimation of the entire speech of the user 2, two intentions (Intents) including Intent="VOLUME_UP" and "MUSIC_REPLAY" are estimated.

When the process in step S35 ends, the Body determination processing of the entire speech ends.

On the other hand, in a case in which it is determined in step S33 that the intention (Intent) of the nth divided speech sentence includes entity information (Entity) of a Body type, the processing is advanced to step S34.

In step S34, the plural intention estimation unit 109 determines whether or not the nth divided speech sentence is located at the top of the speech of the user 2. Here, it is determined whether or not a processing target is n=1, that is to say, the first (top) divided speech sentence.

In a case in which it is determined in step S34 that the nth divided speech sentence is located at the top of the speech of the user 2, because the nth divided speech sentence includes entity information (Entity) of a Body type, but is a top divided speech sentence, the Body determination processing of the entire speech ends.

In addition, in a case in which it is determined in step S34 that the nth divided speech sentence is not located at the top of the speech of the user 2, the processing is advanced to step S36. In step S36, the plural intention estimation unit 109 sets n=n−1 as a divided sentence index n. Here, for example, next to N, an index corresponding to a divided speech sentence provided one ahead, such as N−1, is set.

In step S37, the plural intention estimation unit 109 determines whether or not a rate of speech of the user 2 of the nth divided speech sentence exceeds a threshold value (whether or not the rate of speech is faster than a rate indicated by the threshold value).

In a case in which it is determined in step S37 that the rate of speech of the user 2 exceeds the threshold value, the processing is advanced to step S38.

In step S38, the plural intention estimation unit 109 makes an intention (Intent) of the nth divided speech sentence unexecuted, and estimates an intention in which content thereof is added to entity information (Entity) of a Body type of an intention (Intent) of the last divided speech sentence. The task execution unit 110 thereby executes a task corresponding to a result of intention estimation in which the intention (Intent) of the nth divided speech sentence is added to the entity information (Entity) of a Body type of the intention (Intent) of the last divided speech sentence.

A case where the process in step S38 is executed corresponds to the first example of user intention estimation illustrated in FIG. 7, for example. In FIG. 7, as a result of intention estimation of the entire speech of the user 2, content of the divided speech sentences saying "OK" and "let us start from ten" is added as entity information (Entity) of a Body type of the last divided speech sentence, and Intent="REPLY" and Entity="OK"+"let us start from ten"+"I will wait at a usual location" are obtained.

When the process in step S38 ends, the processing returns to step S34, and the above-described processes are repeated.

On the other hand, in a case in which it is determined in step S37 that the rate of speech of the user is less than the threshold value, the processing is advanced to step S39.

In step S39, the plural intention estimation unit 109 determines that divided speech sentences provided ahead of the nth divided speech sentence are not speeches of a request to the system, and estimates an intention in which intentions (Intents) of the divided speech sentences provided ahead of the nth divided speech sentence are unexecuted. The task execution unit 110 thereby executes a task corresponding to a result of intention estimation in which the intentions (Intents) of the divided speech sentences provided ahead of the nth divided speech sentence are unexecuted.

A case where the process in step S39 is executed corresponds to the second example of user intention estimation illustrated in FIG. 8, for example. In FIG. 8, (an intention (Intent) of) the divided speech sentence saying "For keeping in mind" is unexecuted, and Intent="SCHEJULE-ADD", Entity of Body type="to buy a present for a child"+"go home early", and Entity of Date type="today" are obtained as a result of intention estimation of the entire speech.

When the process in step S39 ends, the Body determination processing of the entire speech ends.

Hereinbefore, a flow of the Body determination processing of the entire speech has been described.

(Flow of Cancel Processing in Division Unit)

Figure 12:
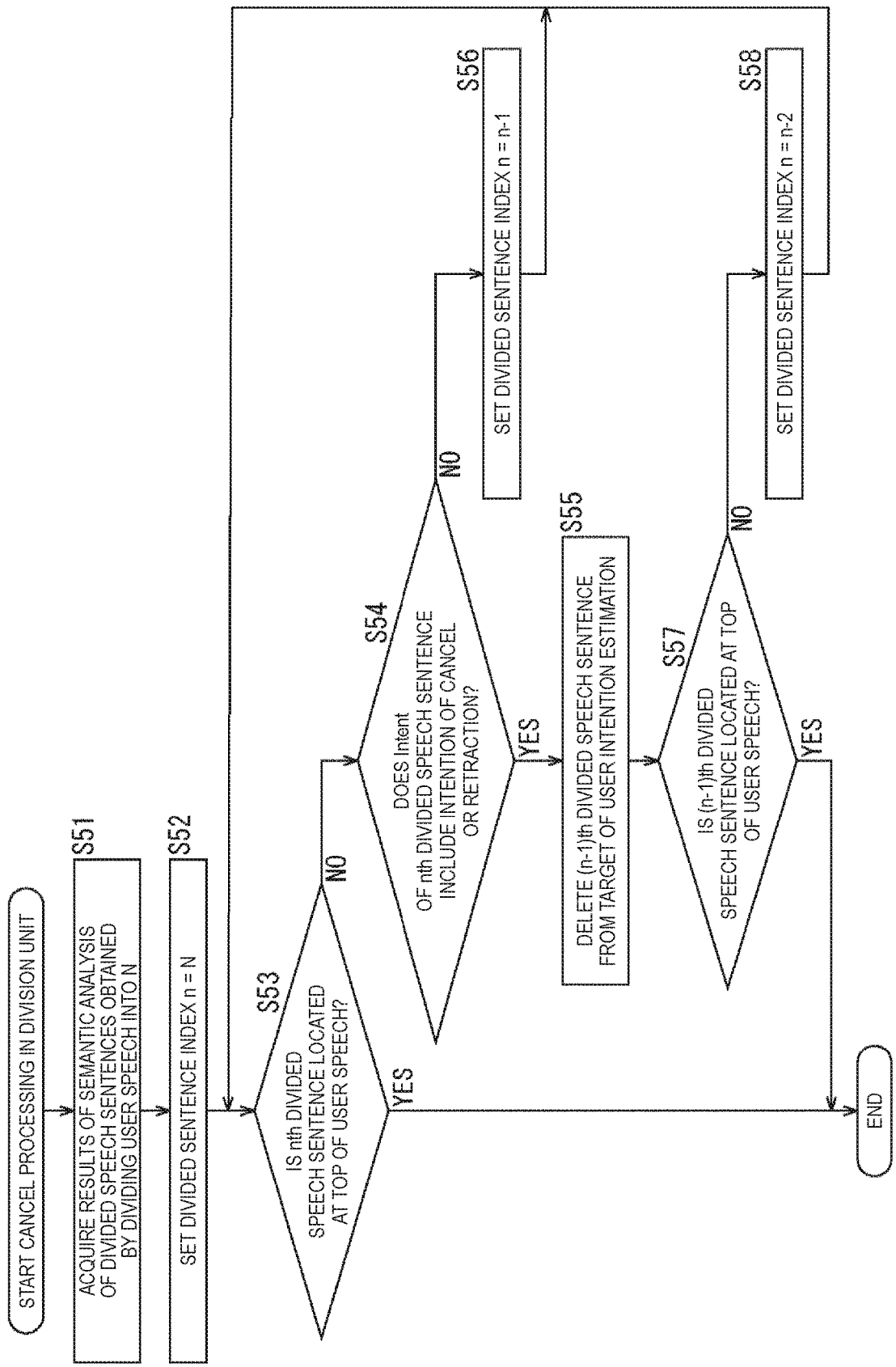
FIG. 12 is a flowchart describing a flow of cancel processing in a division unit.

Next, a flow of cancel processing in a division unit that is to be executed by the speech dialogue system 1 will be described with reference to a flowchart in FIG. 12.

Moreover, the cancel processing in a division unit is included in the process in step S17 that is to be performed after the processes in steps S11 to S16 in the speech dialogue processing in FIG. 3 are repeatedly performed, and a result of semantic analysis (NLU) of each divided speech sentence is obtained.

In step S51, the plural intention estimation unit 109 acquires results of semantic analysis (NLU) of divided speech sentences obtained by dividing a speech of the user into N, which are recorded in the storage unit 116. Here, N is an integer of 1 or more.

In step S52, the plural intention estimation unit 109 sets n=N as a divided sentence index n. By setting n=N, a processing target is set to the last divided speech sentence.

In step S53, the plural intention estimation unit 109 determines whether or not the nth divided speech sentence is located at the top of the speech of the user 2. Here, it is determined whether or not a processing target is n=1, that is to say, the first (top) divided speech sentence.

In a case in which it is determined in step S53 that the nth divided speech sentence is located at the top of the speech of the user 2, because there is no need to perform cancel in a division unit of a speech, the cancel processing in a division unit ends.

On the other hand, in a case in which it is determined in step S53 that the nth divided speech sentence is not located at the top of the speech of the user 2, the processing is advanced to step S54.

In step S54, the plural intention estimation unit 109 determines whether or not an intention (Intent) of the nth divided speech sentence includes an intention of cancel or retraction. Here, examples of the intention of cancel or retraction includes an intention (Intent) corresponding to the above-described divided speech sentences such as "no, it is wrong" or "no, cancel this".

In a case in which it is determined in step S54 that an intention (Intent) of the nth divided speech sentence includes an intention of cancel or the like, the processing is advanced to step S55. In step S55, the plural intention estimation unit 109 deletes an (n−1)th divided speech sentence from a target of intention estimation of the user 2.

For example, in the above-described first example, in a case in which a breakpoint of a speech saying " . . . /set to seven/no, it is wrong/ . . . " is detected, when it is determined that an nth divided speech sentence saying "no, it is wrong" includes an intention of cancel or the like, an (n−1)th divided speech sentence saying "set to seven" is deleted from a target of intention estimation.

In addition, for example, in the above-described second example, in a case in which a breakpoint of a speech saying " . . . /carrot/no, cancel this/ . . . " is detected, when it is determined that an nth divided speech sentence saying "no, cancel this" includes an intention of cancel or the like, an (n−1)th divided speech sentence saying "carrot" is deleted from a target of intention estimation.

On the other hand, in a case in which it is determined in step S54 that an intention (Intent) of the nth divided speech sentence does not include an intention of cancel or the like, the processing is advanced to step S56. In step S56, the plural intention estimation unit 109 sets n=n−1 as a divided sentence index n. Here, for example, next to N, an index corresponding to a divided speech sentence provided one ahead, such as N−1, is set.

When the process in step S56 ends, the processing returns to step S53, and subsequent processes are repeated.

In addition, when the process in step S55 ends, the processing is advanced to step S57. In step S57, the plural intention estimation unit 109 determines whether or not the (n−1)th divided speech sentence is located at the top of the speech of the user 2. Here, it is determined whether or not a processing target is n=2, that is to say, the second divided speech sentence.

In a case in which it is determined in step S57 that the (n−1)th divided speech sentence is located at the top of the speech of the user 2, because there is no need to perform cancel in a division unit of a speech any more, the cancel processing in a division unit ends.

On the other hand, in a case in which it is determined in step S57 that the (n−1)th divided speech sentence is not located at the top of the speech of the user 2, the processing is advanced to step S58. In step S58, the plural intention estimation unit 109 sets n=n−2 as a divided sentence index n. Here, for example, next to N, an index corresponding to a divided speech sentence provided two ahead, such as N−2, is set.

When the process in step S58 ends, the processing returns to step S53, and subsequent processes are repeated.

Hereinbefore, a flow of the cancel processing in a division unit has been described.

In this manner, in the speech dialogue system 1, by detecting a speech property of the user 2, and obtaining a result of semantic analysis (NLU) for each divided speech sentence obtained by dividing a speech sentence in a unit in which the intention of the user 2 is desired to be understood, the intention of the speech of the user 2 can be estimated more accurately.

Meanwhile, in a conventional semantic analysis engine (NLU engine), when extracting an intention (Intent) and entity information (Entity) from a speech sentence of a user, it has been difficult to correctly extract an intention (Intent) and entity information (Entity) from a long sentence or a complex sentence that includes a plurality of intentions. In other words, as a sentence to be spoken by the user becomes longer, a possibility of including a plurality of intentions (Intents) and pieces of entity information (Entity) becomes higher, and this prevents the conventional semantic analysis engine from estimating a unique intention (Intent).

In addition, in the conventional speech dialogue system, in a case in which the user performs a long speech, when an intention (Intent) thereof cannot be correctly estimated, a system behavior not intended by the user is caused. As a result, the user only performs a speech that is based on a short sentence or a command, to the speech dialogue system, and cannot depart from an input user interface (UI: User Interface) that uses a voice command.

Here, the above-described voice command means a user emitting a specific command using a voice, and means that the command is not a natural speech performed by the user.

In contrast to this, in the speech dialogue system 1, because a speech property of a person is detected and a result of semantic analysis (NLU) is obtained for each divided speech sentence obtained by dividing a speech sentence, in a unit in which the intention of the user 2 is desired to be understood, an intention (Intent) and entity information (Entity) that follow the speech of the user 2 can be obtained. Thus, in the speech dialogue system 1, even in a case in which a long sentence or a complex sentence that includes a plurality of intentions is spoken by the user 2 (in a case in which a speech of the user 2 includes a plurality of request intentions to the system), it becomes possible to correctly estimate each of the request intentions and collectively execute tasks corresponding to respective request tasks.

As a result, the user 2 is expected to stop performing a dialogue turn using a short sentence speech like a voice command, for each request task. In addition, the user 2 gets such an experience that the system correctly understands an intention and operates, even when the user 2 speaks a long sentence or a complex sentence, and through the experience, the user 2 feels that a speech using a long sentence or a complex sentence can be performed to the system.

Furthermore, in the speech dialogue system 1, because a plurality of dialogue turns that uses a short sentence speech like a voice command is not required for obtaining an intention of a complicated speech of the user 2, it becomes possible to perform a natural dialogue to the user 2 without causing awareness of a dialogue turn.

In addition, in the speech dialogue system 1, for example, because it becomes possible to correctly extract content (Body) of a message from a speech sentence at the time of a speech of a creation request of a message of an e-mail, a social networking service (SNS), or the like, it becomes possible to collectively process the creation request of a message and an input of content (Body) of the message in one dialogue turn, without processing the creation request of a message and an input of content (Body) of the message in different dialogue turns, for example.

2. Modified Example

As an example, the above description has been given of a configuration of the speech dialogue system 1 in which structural elements from the voice input unit 101 to the sensor unit 103, the voice output unit 114, and the image output unit 115 are incorporated into the terminal device 10 on a local side, and structural elements from the speech recognition unit 104 to the output image processing unit 113 are incorporated into the server 20 on a cloud side, but each of the structural elements from the voice input unit 101 to the image output unit 115 may be incorporated into whichever device of the terminal device 10 and the server 20.

For example, all the structural elements from the voice input unit 101 to the image output unit 115 may be incorporated into the terminal device 10 side, and processing may be completed on the local side. Nevertheless, even in a case in which such a configuration is employed, various types of databases may be managed by the server 20 on the internet 30.

In addition, in the speech recognition processing to be performed by the speech recognition unit 104, and the semantic analysis processing to be performed by the semantic analysis unit 108, a speech recognition service and a semantic analysis service that are provided in another service may be used. In this case, for example, in the server 20, by sending voice data to the speech recognition service provided on the internet 30, a result of speech recognition can be obtained. In addition, for example, in the server 20, by sending data of a divided speech sentence to the semantic analysis service provided on the internet 30, a semantic analysis result (Intent, Entity) of each divided speech sentence can be obtained.

3. Configuration of Computer

Figure 13:
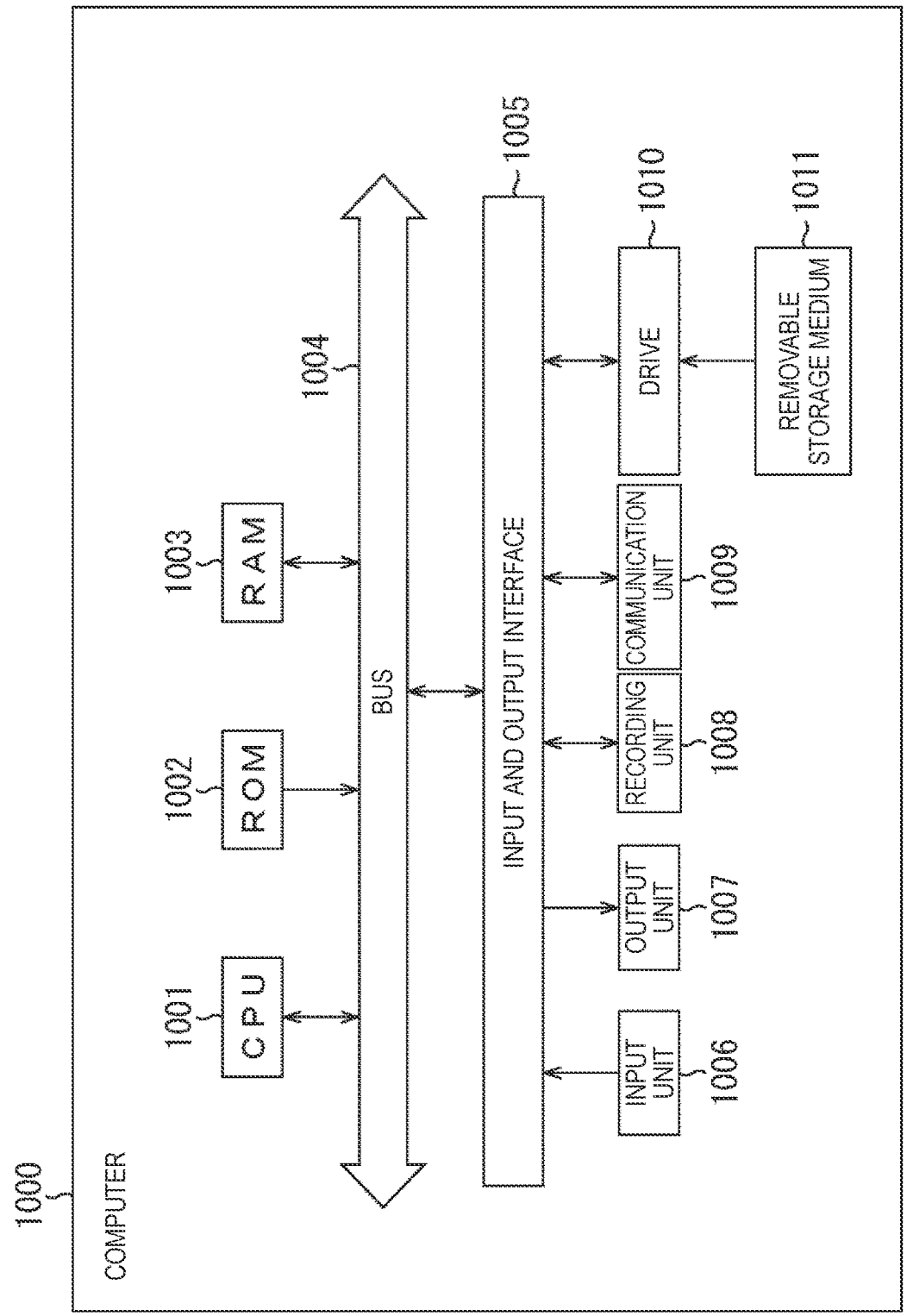
FIG. 13 is a diagram illustrating a configuration example of a computer.

The above-described series of processes (e.g. the speech dialogue processing illustrated in FIG. 3, etc.) may be executed by hardware or software. In a case in which the series of processes is executed by software, a program including the software is installed on each computer. FIG. 13 is a block diagram illustrating an example of a hardware configuration of a computer in which the above-described series of processes is executed by the program.

In a computer 1000, a central processing unit (CPU) 1001, a read-only memory (ROM) 1002, and a random access memory (RAM) 1003 are connected to each other by a bus 1004. An input and output interface 1005 is further connected to the bus 1004. An input unit 1006, an output unit 1007, a recording unit 1008, a communication unit 1009, and a drive 1010 are connected to the input and output interface 1005.

A microphone, a keyboard, a mouse, or the like is used as the input unit 1006. A speaker, a display, or the like is used as the output unit 1007. A hard disk, a nonvolatile memory, or the like is used as the recording unit 1008. A network interface or the like is used as the communication unit 1009. The drive 1010 drives the removable recording medium 1011 such as a magnetic disk, an optical disc, a magneto-optical disc, or a semiconductor memory.

In the computer 1000 that has the above-described configuration, the CPU 1001 executes the above-described series of processes by loading a program recorded on the ROM 1002 or the recording unit 1008 to the RAM 1003 via the input and output interface 1005 and the bus 1004 and executing the program.

The program executed by the computer 1000 (the CPU 1001) can be recorded on, for example, the removable recording medium 1011 such as a package medium for supply. In addition, the program can be supplied via a wired or wireless transmission medium such as a local area network, the Internet, or digital broadcasting.

In the computer 1000, the program can be installed on the recording unit 1008 via the input and output interface 1005 by mounting the removable recording medium 1011 on the drive 1010. In addition, the program can be received by the communication unit 1009 via a wired or wireless transmission medium and can be installed on the recording unit 1008. Additionally, the program can be installed in advance on the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Moreover, embodiments of the present technology are not limited to the above-described embodiments, but various changes can be made within the scope of the present technology without departing from the gist of the present technology.

In addition, each step of the speech dialogue processing illustrated in FIG. 3 can be executed by a plurality of devices in a shared manner, in addition to being executed by one device. Furthermore, in a case in which one step includes a plurality of processes, the plurality of processes included in the one step can be executed by a plurality of devices in a shared manner, in addition to being executed by one device.

Additionally, the present technology may also be configured as below.

(1)

An information processing device including:

a detection unit configured to detect a breakpoint of a speech of a user on the basis of a result of recognition that is to be obtained during the speech of the user; and an estimation unit configured to estimate an intention of the speech of the user on the basis of a result of semantic analysis of a divided speech sentence obtained by dividing a speech sentence at the detected breakpoint of the speech.

(2)

The information processing device according to (1), in which the result of the recognition includes at least one result of recognition of a result of recognition of voice data of the speech of the user, a result of recognition of image data obtained by capturing an image of the user, or a result of recognition of sensor data obtained by sensing the user or a surrounding of the user.

(3)

The information processing device according to (2), in which the detection unit detects the breakpoint of the speech on the basis of a state or a gesture of the user that is to be obtained from the result of the recognition.

(4)

The information processing device according to any of (1) to (3), in which the estimation unit estimates an intention of the speech of the user on the basis of an intention (Intent) and entity information (Entity) that are to be sequentially obtained for each of the divided speech sentences.

(5)

The information processing device according to (4), in which the estimation unit extracts an intention (Intent) that follows the speech sentence, from among intentions (Intents) of the respective divided speech sentences.

(6)

The information processing device according to (4) or (5), in which the estimation unit extracts entity information (Entity) that follows the speech sentence, from among pieces of entity information (Entity) of the respective divided speech sentences.

(7)

The information processing device according to (4), in which the entity information (Entity) includes, as a type thereof, a Body type representing that a free speech is included, and in a case in which an intention (Intent) of a last divided speech sentence includes entity information (Entity) of a Body type, in a case in which a target divided speech sentence being a divided speech sentence provided ahead of the last divided speech sentence, and being targeted satisfies a specific condition, the estimation unit makes an intention (Intent) of the target divided speech sentence unexecuted, and adds content thereof to entity information (Entity) of a Body type that is included in the intention (Intent) of the last divided speech sentence.

(8)

The information processing device according to (7), in which, in a case in which the target divided speech sentence does not satisfy the specific condition, the estimation unit discards the intention (Intent) of the target divided speech sentence.

(9)

The information processing device according to (8), in which the specific condition includes a condition for determining whether or not a rate of the speech of the user exceeds a predetermined threshold value, or a condition for determining whether or not the user looks at a predetermined target.

(10)

The information processing device according to (4), in which the entity information (Entity) includes, as a type thereof, a Body type representing that a free speech is included, and when the divided speech sentence including entity information (Entity) of a Body type does not exist, the estimation unit estimates an intention of the speech of the user in accordance with intentions (Intents) of the respective divided speech sentences.

(11)

The information processing device according to any of (4) to (10), in which, when the speech of the user includes an intention (Intent) of retraction, the estimation unit deletes a divided speech sentence to be retracted, from a target of intention estimation of the speech of the user.

(12)

The information processing device according to (11), in which, when an nth divided speech sentence includes an intention (Intent) of retraction, the estimation unit deletes an (n−1)th divided speech sentence from a target of intention estimation of the speech of the user.

(13)

The information processing device according to any of (1) or (12), further including a generation unit configured to generate feedback information to be output at the detected breakpoint of the speech.

(14)

The information processing device according to (13), in which the feedback information includes a voice, a sound effect, or an image.

(15)

The information processing device according to (2) or (3), in which the detection unit detects the breakpoint of the speech on the basis of the result of the recognition of the voice data, when a time of a pause of the speech of the user exceeds a fixed time, when a boundary of an intonation phrase included in the speech of the user is detected, or when falter or filler included in the speech of the user is detected.

(16)

The information processing device according to (2) or (3), in which the detection unit detects the breakpoint of the speech on the basis of the result of the recognition of the image data, wen a time in which a mouth of the user does not move exceeds a fixed time, or when a big movement of a visual line of the user is detected.

(17)

The information processing device according to (2) or (3), in which the detection unit detects the breakpoint of the speech on the basis of the result of the recognition of the sensor data, when intake of breath of the user is detected, or a movement of an entire or a part of a body of the user is detected.

(18)

The information processing device according to any of (1) to (17), further including a task execution unit configured to execute a task on the basis of a result of intention estimation of the speech of the user.

(19)

The information processing device according to any of (1) to (18), further including:

a speech recognition unit configured to perform speech recognition (ASR) for obtaining the speech sentence from the speech of the user; and a semantic analysis unit configured to perform semantic analysis (NLU) of the divided speech sentence to be sequentially obtained at the breakpoint of the speech.

(20)

An information processing method of an information processing device, the information processing method including:

the information processing device detecting a breakpoint of a speech of a user on the basis of a result of recognition that is to be obtained during the speech of the user; and estimating an intention of the speech of the user on the basis of a result of semantic analysis of a divided speech sentence obtained by dividing a speech sentence at the detected breakpoint of the speech.

REFERENCE SIGNS LIST 1 speech dialogue system
10 terminal device
20 server
30 internet
101 voice input unit
102 image input unit
103 sensor unit
104 speech recognition unit
105 image recognition unit
106 sensor recognition unit
107 speech breakpoint detection unit
108 semantic analysis unit
109 plural intention estimation unit
110 task execution unit
111 sound effect replay unit
112 speech synthesis processing unit
113 output image processing unit
114 voice output unit
115 image output unit
116 storage unit
1000 computer
1001 CPU

The invention claimed is:

1. An information processing device comprising:
a detection unit configured to detect a breakpoint of a speech of a user on a basis of a result of recognition that into be obtained during the speech of the user;
an estimation unit configured to estimate an intention of the speech of the user on a basis of a result of semantic analysis, via a natural language understanding unit, of a divided speech sentence obtained by dividing a speech sentence at the detected breakpoint of the speech; and
a generation unit configured to generate feedback information via a speech synthesis unit to be output based on a time that the breakpoint of the speech is detected, and change the feedback information based on the estimated intention of the speech of the user, wherein the detection unit is further configured to detect the breakpoint of the speech on a basis of whether or not a visual line, detected by an image sensor, of the user is directed towards display information displayed on an image output unit, and wherein the detection unit, the estimation unit, the natural language understanding unit, the speech synthesis unit, and the generation unit are each implemented via at least one processor.

2. The information processing device according to claim 1, wherein the result of the recognition includes at least one result of a result of recognition of voice data of the speech of the user obtained by a microphone capturing a voice emitted by the user, a result of recognition of image data obtained by a camera capturing an image of the user, or a result of recognition of sensor data obtained by sensing the user or a surrounding of the user.

3. The information processing device according to claim 2, wherein the detection unit is further configured to detect the breakpoint of the speech on a basis of a state or a gesture of the user that is to be obtained from the result of the recognition.

4. The information processing device according to claim 1, wherein the estimation unit is further configured to estimate an intention of the speech of the user on a basis of an intention (Intent) and entity information (Entity) that are to be sequentially obtained for each of the divided speech sentences.

5. The information processing device according to claim 4, wherein the estimation unit is further configured to extract an intention (Intent) that follows the speech sentence, from among intentions (Intents) of respective divided speech sentences.

6. The information processing device according to claim 4, wherein the estimation unit is further configured to extract entity information (Entity) that follows the speech sentence, from among pieces of entity information (Entity) of respective divided speech sentences.

7. The information processing device according to claim 4, wherein the entity information (Entity) includes, as a type thereof, a Body type representing that a free speech is included, and in a case in which an intention (Intent) of a last divided speech sentence includes entity information (Entity) of a Body type, in a case in which a target divided speech sentence being a divided speech sentence provided ahead of the last divided speech sentence, and being targeted satisfies a specific condition, the estimation unit is further configured to make an intention (Intent) of the target divided speech sentence unexecuted, and add content thereof to entity information (Entity) of a Body type that is included in the intention (Intent) of the last divided speech sentence.

8. The information processing device according to claim 7, wherein, in a case in which the target divided speech sentence does not satisfy the specific condition, the estimation unit is further configured to discard the intention (Intent) of the target divided speech sentence.

9. The information processing device according to claim 8, wherein the specific condition includes a condition for determining whether or not a rate of the speech of the user exceeds a predetermined threshold value, or a condition for determining whether or not the user looks at a predetermined target.

10. The information processing device according to claim 4, wherein the entity information (Entity) includes, as a type thereof, a Body type representing that a free speech is included, and when the divided speech sentence including entity information (Entity) of a Body type does not exist, the estimation unit is further configured to estimate an intention of the speech of the user in accordance with intentions (Intents) of respective divided speech sentences.

11. The information processing device according to claim 4, wherein, when the speech of the user includes an intention (Intent) of retraction, the estimation unit is further configured to delete a divided speech sentence to be retracted, from a target of intention estimation of the speech of the user.

12. The information processing device according to claim 11, wherein, when an nth divided speech sentence includes an intention (Intent) of retraction, the estimation unit is further configured to delete an (n−1)th divided speech sentence from a target of intention estimation of the speech of the user.

13. The information processing device according to claim 1, wherein the feedback information includes a voice, a sound effect, or an image.

14. The information processing device according to claim 3, wherein the detection unit is further configured to detect the breakpoint of the speech on a basis of the result of the recognition of the voice data, when a time of a pause of the speech of the user exceeds a fixed time, when a boundary of an intonation phrase included in the speech of the user is detected, or when falter or filler included in the speech of the user is detected.

15. The information processing device according to claim 3, wherein the detection unit is further configured to detect the breakpoint of the speech on a basis of the result of the recognition of the image data, when a time in which a mouth of the user does not move exceeds a fixed time, or when a movement of the visual line of the user that exceeds a predetermined threshold is detected.

16. The information processing device according to claim 3, wherein the detection unit is further configured to detect the breakpoint of the speech on a basis of the result of the recognition of the sensor data, when intake of breath of the user is detected, or a movement of an entire or a part of a body of the user is detected.

17. The information processing device according to claim 1, further comprising a task execution unit configured to execute a task on a basis of a result of intention estimation of the speech of the user, wherein the task execution unit is implemented via at least one processor.

18. The information processing device according to claim 17, further comprising:

a speech recognition unit configured to perform speech recognition (ASR) for obtaining the speech sentence from the speech of the user; and a semantic analysis unit configured to perform semantic analysis (NLU) of the divided speech sentence to be sequentially obtained at the breakpoint of the speech, wherein the speech recognition unit and the semantic analysis unit are each implemented via at least one processor.

19. An information processing method of an information processing device, the information processing method comprising:

detecting a breakpoint of a speech of a user on a basis of a result of recognition that is to be obtained during the speech of the user;

estimating an intention of the speech of the user on a basis of a result of semantic analysis, via a natural language understanding unit, of a divided speech sentence obtained by dividing a speech sentence at the detected breakpoint of the speech; and generating feedback information via a speech synthesis unit to be output based on a time that the breakpoint of the speech is detected, and change the feedback information based on the estimated intention of the speech of the user, wherein the breakpoint of the speech of the user is further detected on a basis of whether or not a visual line, detected by an image sensor, of the user is directed towards display information displayed on an image output unit, wherein the natural language understanding unit, the speech synthesis unit, and the image output unit are each implemented via at least one processor.

20. A non-transitory computer-readable medium having embodied thereon a program, which when executed by a computer causes the computer to execute an information processing method, the method comprising:

detecting a breakpoint of a speech of a user on a basis of a result of recognition that is to be obtained during the speech of the user;

estimating an intention of the speech of the user on a basis of a result of semantic analysis, via a natural language understanding unit, of a divided speech sentence obtained by dividing a speech sentence at the detected breakpoint of the speech; and generating feedback information via a speech synthesis unit to be output based on a time that the breakpoint of the speech is detected, and change the feedback information based on the estimated intention of the speech of the user, wherein the breakpoint of the speech of the user is further detected on a basis of whether or not a visual line, detected by an image sensor, of the user is directed towards display information displayed on an image output unit, wherein the natural language understanding unit, the speech synthesis unit, and the image output unit are each implemented via at least one processor.

21. The information processing device according to claim 1, wherein generation unit is further configured to change the feedback information to be a first value based on obtaining the estimated intention of the speech of the user, and change the feedback information to be a second value different than the first value based on not obtaining the estimated intention of the speech of the user.

* * * * *